United States Patent [19]
Leu et al.

[11] Patent Number: 6,084,576
[45] Date of Patent: Jul. 4, 2000

[54] USER FRIENDLY KEYBOARD

[76] Inventors: Neng-Chyang Leu; William Leu, both of 4702 Willow, Bellaire, Tex. 77401

[21] Appl. No.: 09/034,373

[22] Filed: Mar. 4, 1998

Related U.S. Application Data

[63] Continuation of application No. 08/944,056, Sep. 27, 1997, abandoned.

[60] Provisional application No. 60/069,072, Dec. 9, 1997.

[51] Int. Cl.[7] .................................................. G09G 5/00
[52] U.S. Cl. ......................................... 345/168; 341/22
[58] Field of Search ............................... 345/168; 341/22

[56] References Cited

U.S. PATENT DOCUMENTS

| | | | |
|---|---|---|---|
| 3,929,216 | 12/1975 | Einbinder | 197/100 |
| 3,945,482 | 3/1976 | Einbinder | 197/100 |
| 4,332,493 | 6/1982 | Einbinder | 400/484 |
| 4,579,470 | 4/1986 | Casey | 400/489 |
| 4,715,736 | 12/1987 | McGunnigle | 400/484 |
| 4,824,268 | 4/1989 | Diernisse | 400/486 |
| 5,059,048 | 10/1991 | Sirkin | 400/486 |
| 5,119,078 | 6/1992 | Grant | 340/711 |
| 5,129,747 | 7/1992 | Hutchison | 400/489 |
| 5,178,477 | 1/1993 | Gambaro | 400/489 |
| 5,318,867 | 6/1994 | Bruan et al. | 400/82 |
| 5,360,280 | 11/1994 | Camacho et al. | 400/489 |
| 5,367,298 | 11/1994 | Axthelm | 341/22 |
| 5,481,263 | 1/1996 | Choi | 341/20 |
| 5,498,088 | 3/1996 | Choate | 400/486 |
| 5,574,481 | 11/1996 | Lee | 345/168 |
| 5,612,691 | 3/1997 | Murmann et al. | 345/168 |
| 5,612,718 | 3/1997 | Bryan | 345/168 |
| 5,731,808 | 3/1998 | Gaither | 345/168 |
| 5,841,635 | 11/1998 | Sadler et al. | 345/168 |

*Primary Examiner*—Richard A. Hjerpe
*Assistant Examiner*—Ronald Laneau
*Attorney, Agent, or Firm*—Rick Martin

[57] ABSTRACT

A ergonomic keyboard that is suitable for all devices interfacing with a keyboard; and that is able to transmit on an unlimited amount of information including the more than 50 alphabets of the world, numbers, other symbols, programming, and operational information. The keyboard is ergonomically designed to take maximum advantage of the shape, dexterity, and strength of the hands and fingers so that the majority of the fingers on both hands are always naturally positioned on the home keys, and so the reaching to the other keys is natural and effortless. The ergonomic design and optimum distribution of the information bits on the keys makes the transfer of information on this keyboard the fastest possible with the least amount of effort and the least amount of errors, and it also makes the learning the fastest and easiest possible. A palm rest, thumb-activated trackball, one-hand typing option, palm keys, and an integrated joystick with a circular motion sensor around the palm rest offer the user unheralded ease of use.

31 Claims, 25 Drawing Sheets

(1 of 25 Drawing Sheet(s) Filed in Color)

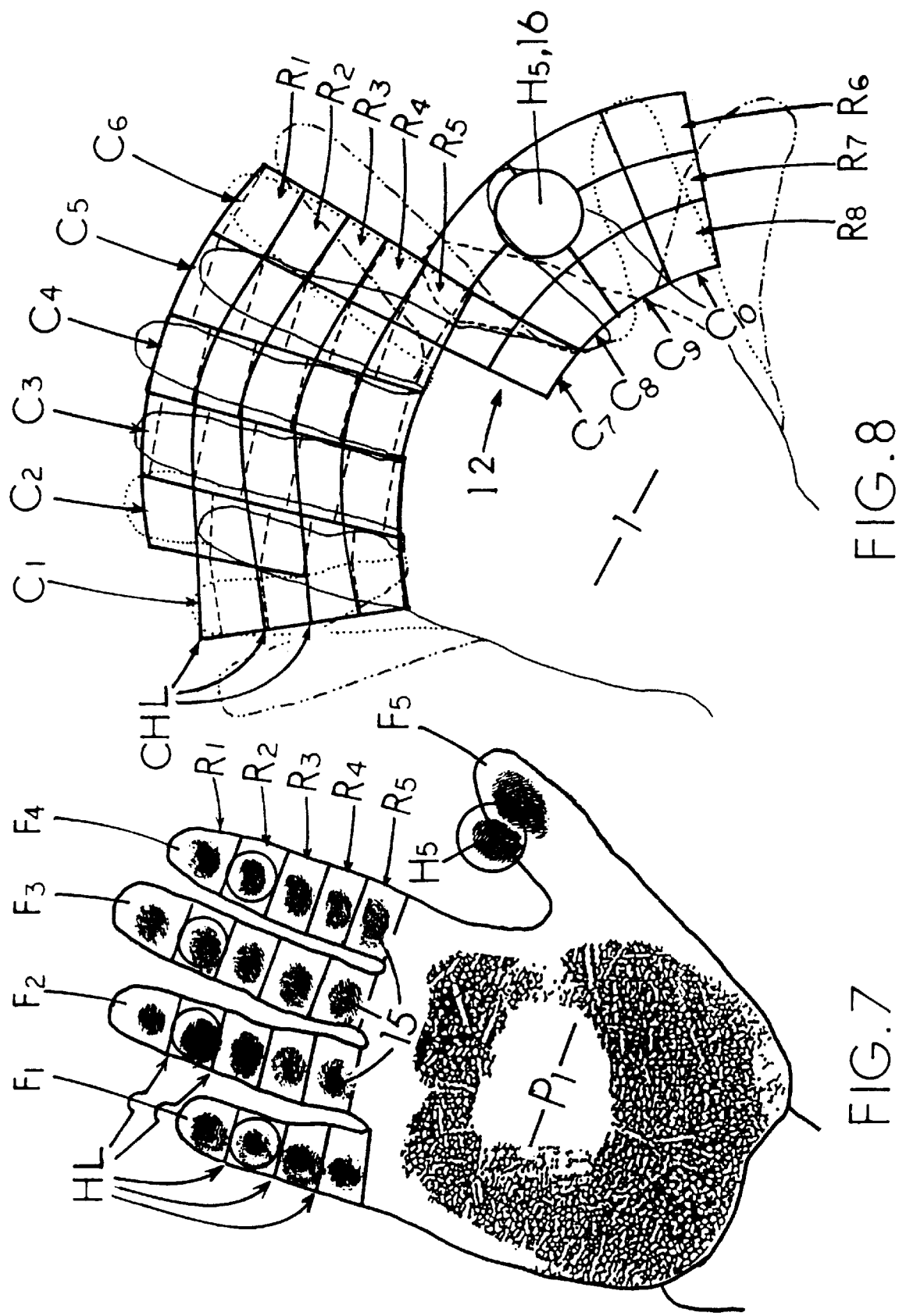

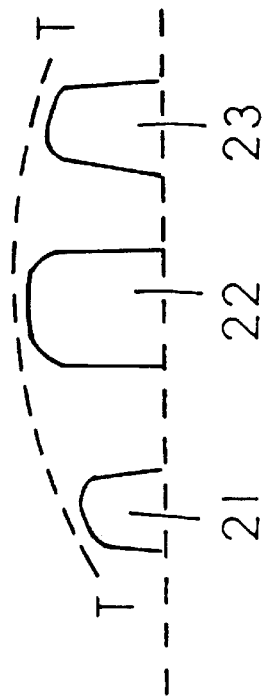
FIG. 10
FIG. 11
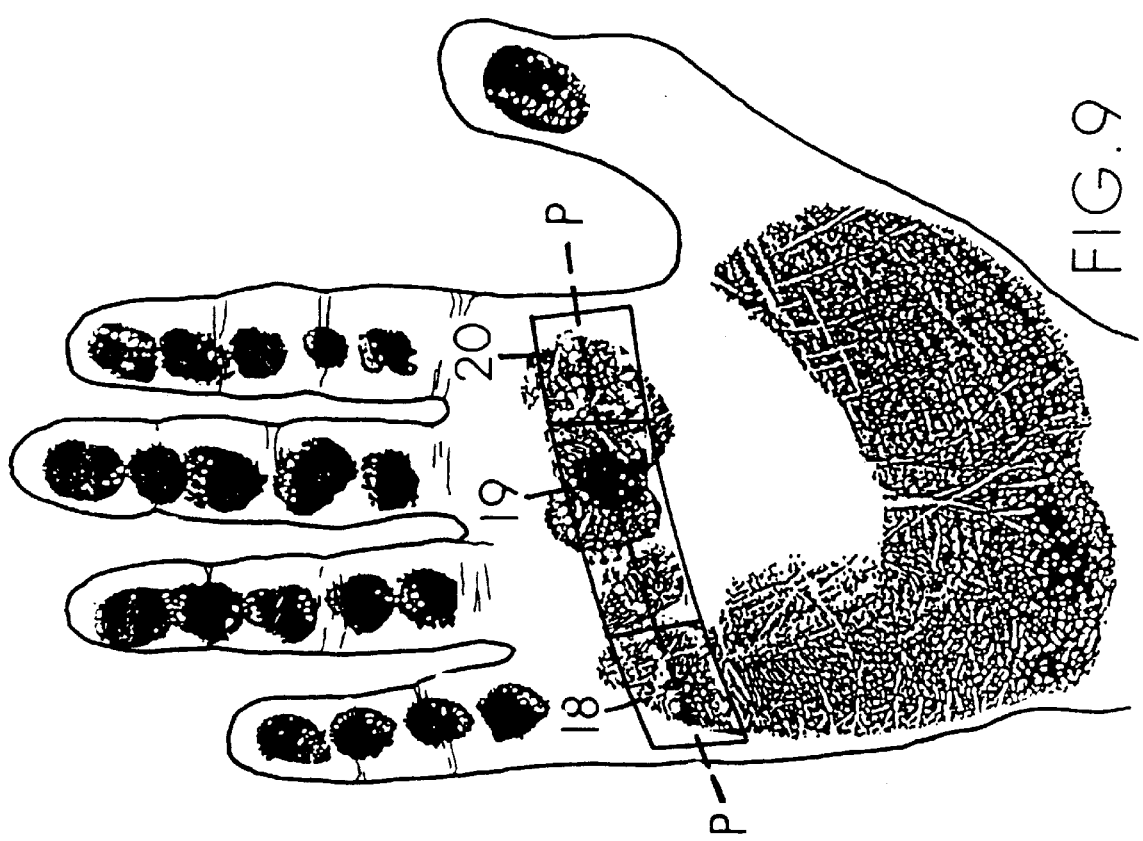
FIG. 9

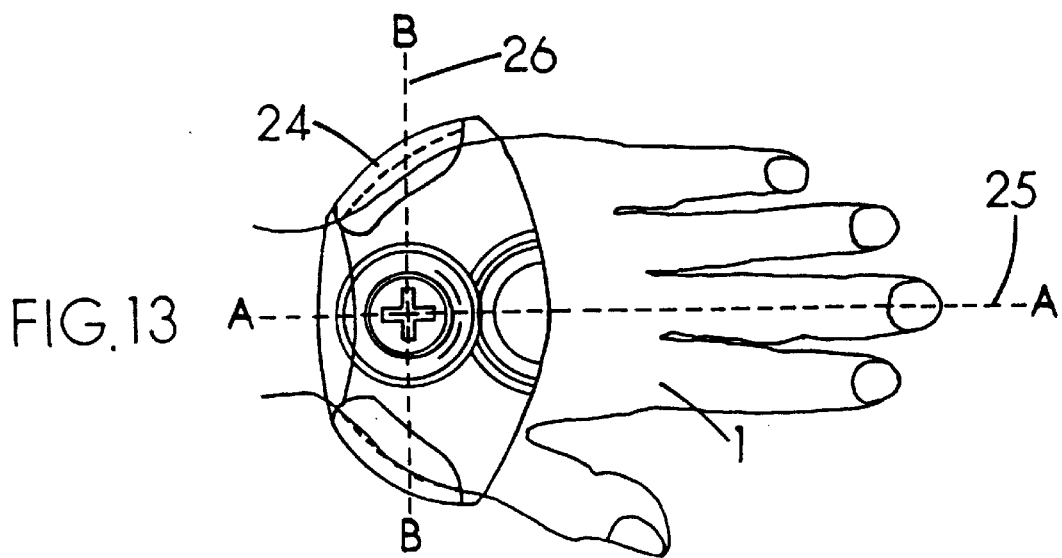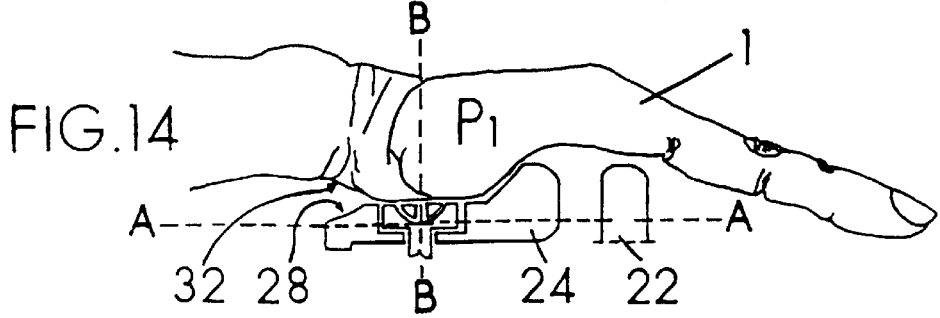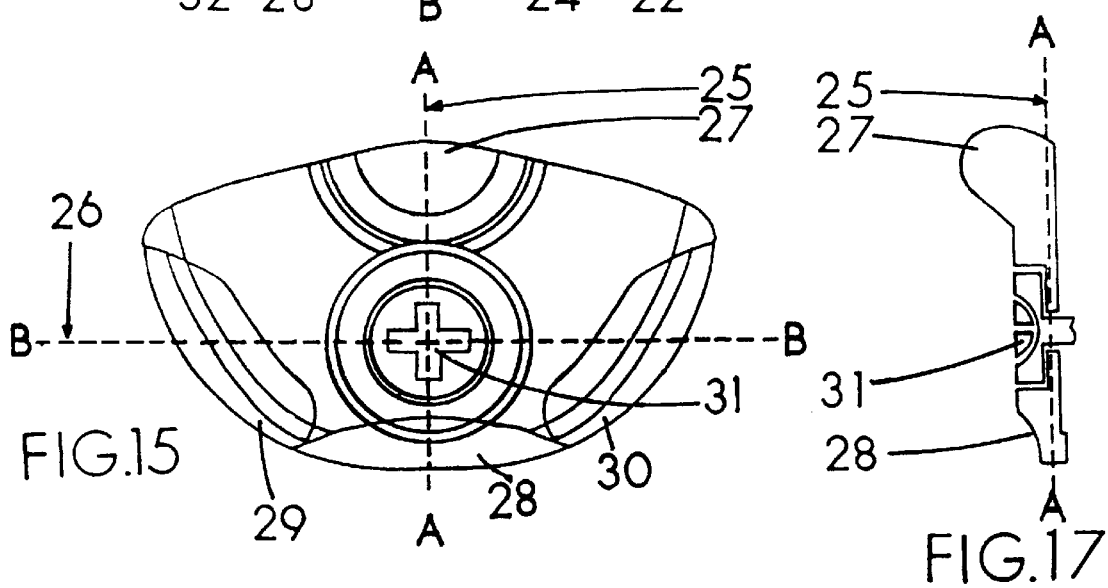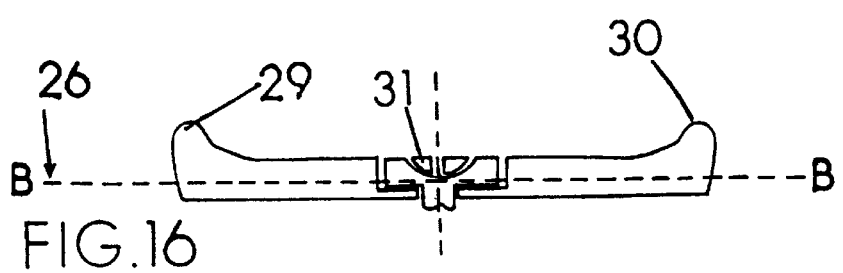

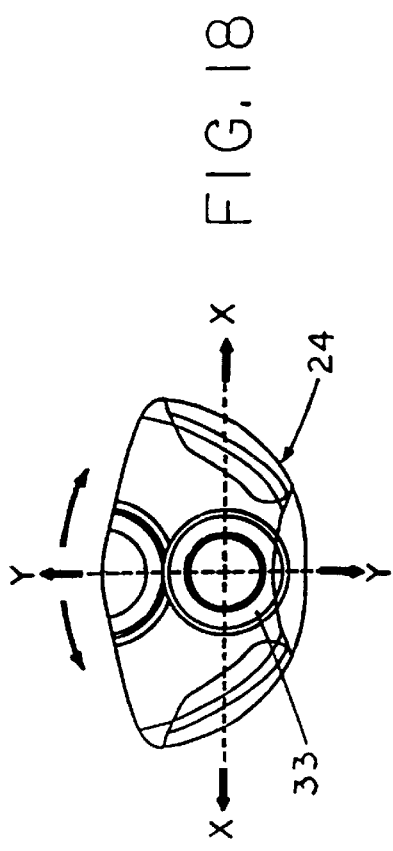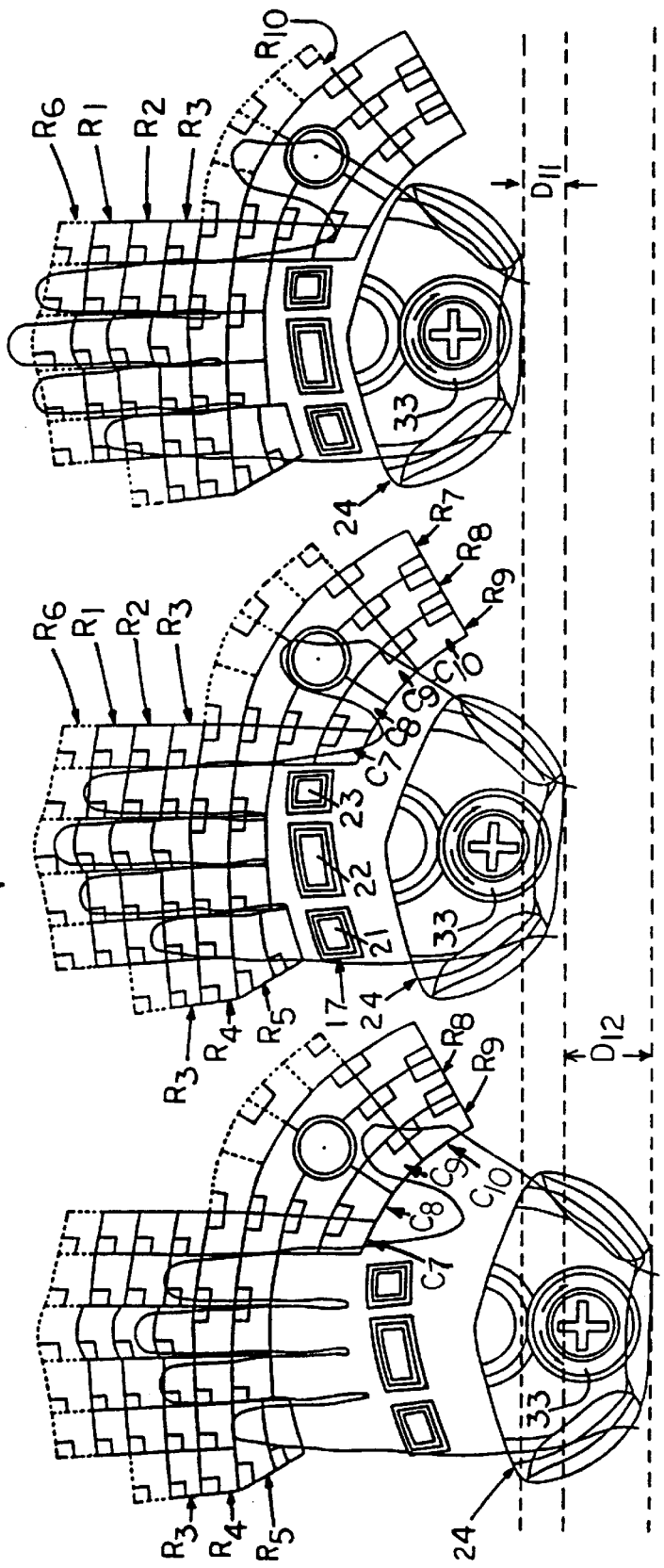

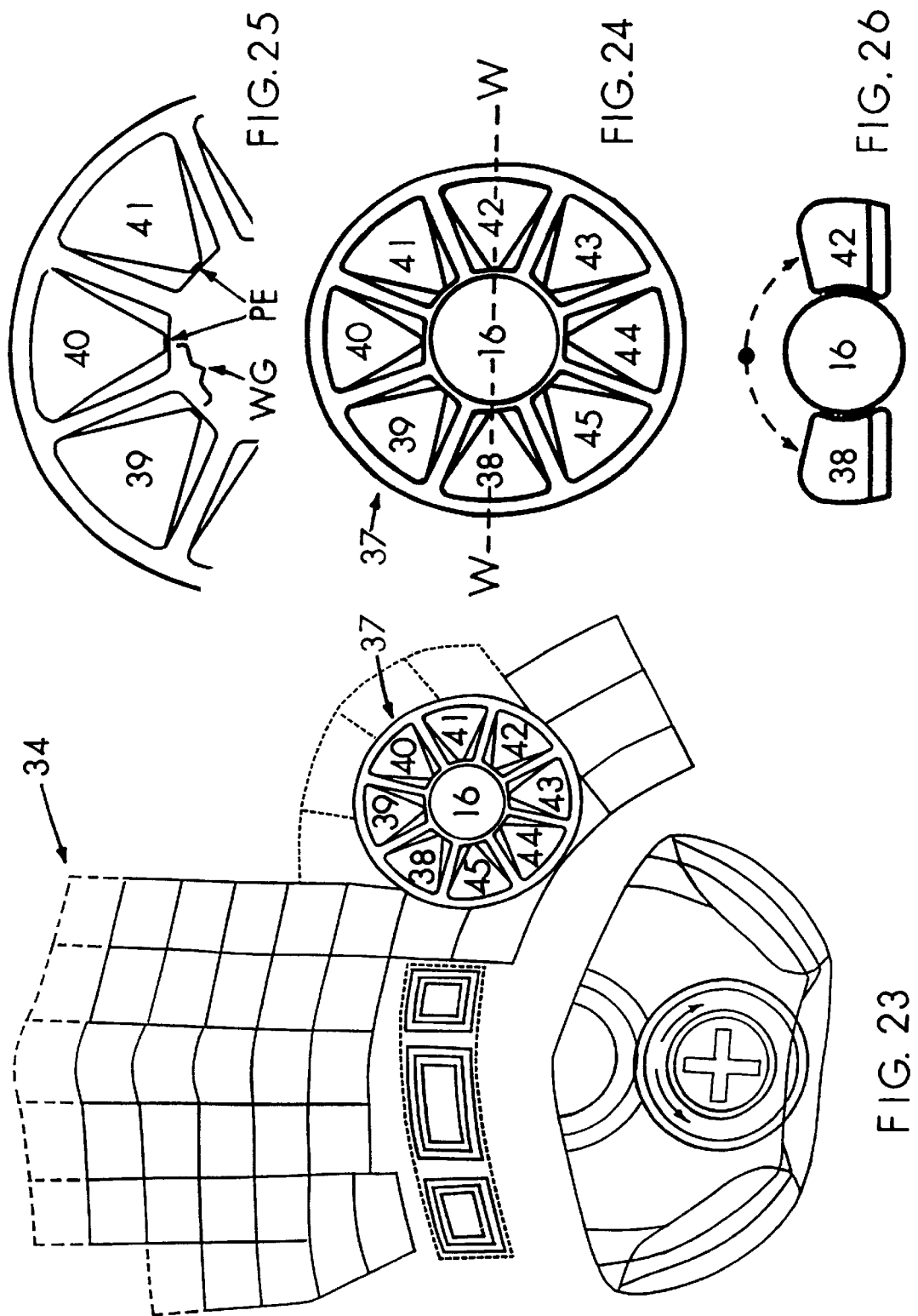

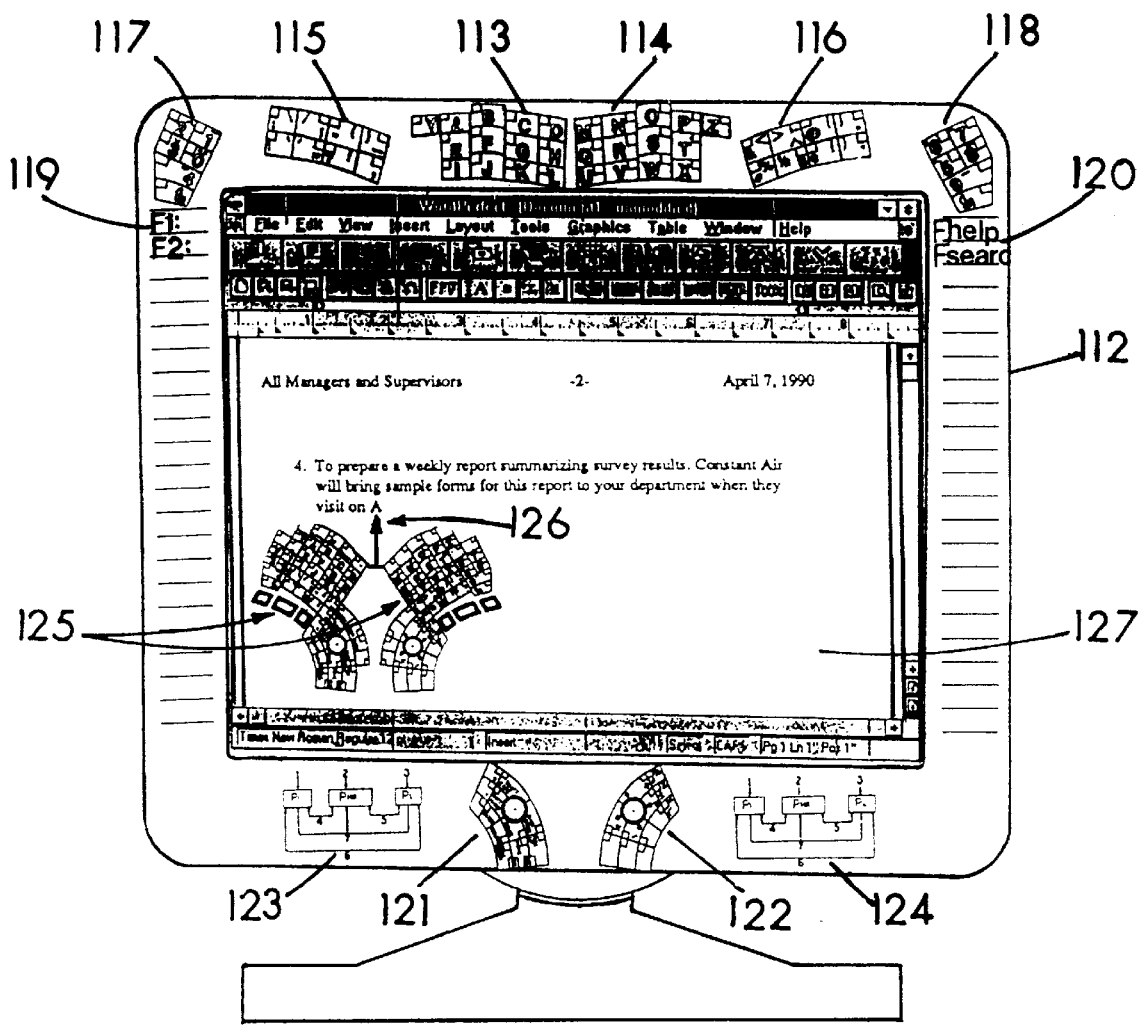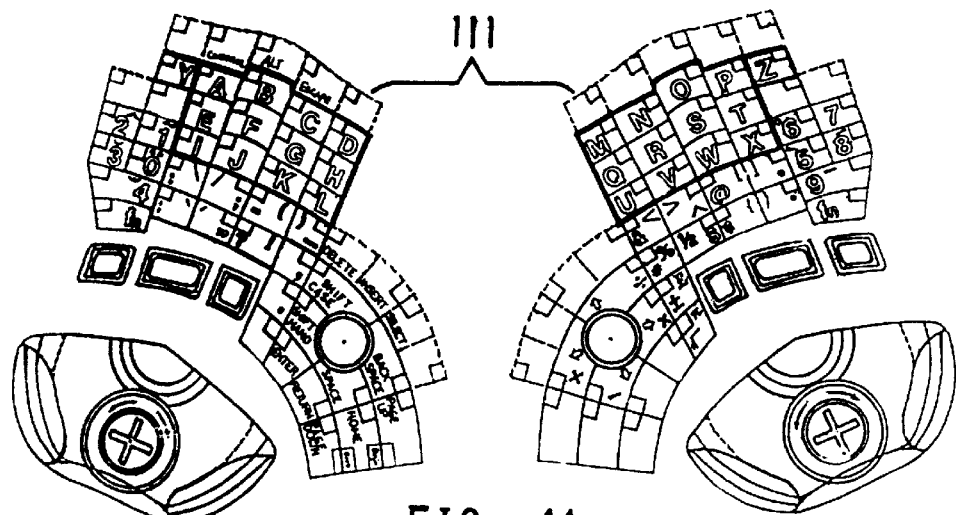
FIG. 41

USER FRIENDLY KEYBOARD

CROSS REFERENCE TO RELATED APPLICATIONS

Applicant hereby claims the benefit of U.S. provisional application Ser. No. 60/069,072 filed Dec. 9, 1997, and this is a continuation of U.S. application Ser. No. 08/944,056 filed Sep. 27, 1997, now abandoned.

FIELD OF INVENTION

The present invention relates to an improved and integrated computer keyboard which is contoured to fit a user's hands in the most relaxed position. A palm rest supports the weight of the hand during typing. Joysticks and cursor controllers are manipulated by the palm and thumb respectively. Some user friendly keyboard formats simplify users' learning curve.

BACKGROUND OF THE INVENTION

At the turn of the century mechanical typewriter keyboards were jamming due to the typist's speed.

The standard, so-called, QWERTY keyboard for transmitting or input of information is very inefficient. It typically has 44 keys in two shift modes for the transmission of 88 characters and 15 to 20 other keys and levers for such functions as spacing, mode shifting, and paper adjusting. With minor modifications this keyboard is used around the world and normally has four parallel rows of keys in a rectangular pattern.

With more sophisticated typewriters, word processors, and computers, the keyboard must perform more functions and transmit more types of information. To do this, more keys, levers, and other control devices have been added so that there now are keyboards with more than 125 keys in addition to the other devises. In addition, each key often has to perform more tasks. With the use of shift, control, alternate, and other mode changing keys, it is now common to have each key perform four or more tasks.

Very few typists ever learn to operate the standard four row keyboard efficiently, but the so-called improvements make it almost impossible to enter information automatically by what is commonly called touch typing. This has slowed down the transmitting of information and increased the number of errors produced. Other devices, such as the mouse and joysticks, have not helped to solve the problem. The QWERTY keyboard was designed to slow the typist's fingers down so as to avoid jamming the keys. Thus, we are calling the results of the QWERTY keyboard "finger jamming".

Also, character arrangement in QWERTY-style keyboards is another problematic issue. For example, alphabents are the most frequently used character in a keyboard. Alphabet arrangement in a QWERTY-style keyboard does not follow any organized logical pattern (e.g. alphabetic order). Unorganized character assignment in a keyboard creates difficulty in memorization of the keyboard format. Thus, we are calling the result of QWERTY keyboard "brain jamming".

Also, the key array in the QWERTY keyboard has straight horizontal rows and rightward vertical staggerings. The straight horizontal rows do not correspond to the irregular architecture of hand and fingers. The rightward vertical staggering array of keys is to make adequate space to accommodate a serial array of levers that are connected to the key in a mechanical typewriter. However, the rightward vertical staggering array of keys violates the ergonomic typing gesture of the left hand.

In short, the QWERTY keyboard is inefficient (finger jam), difficult to learn (brain jam) and unergonomic as to the key arrays.

Many efforts have been made in the past years to correct the shortcomings of the QWERTY-style keyboards, and they all ended in vain. This is because none of those improved keyboards is user friendly. A new keyboard, regardless of its other merits, if it is not designed to be user friendly, will encounter resistance from all user aspects—the professional typists, the general public, and the keyboard manufacturers.

A keyboard is a main interface means that allows a user to manipulate data via computer. In the near future over 75% of new jobs will require computer operating skills. Unfortunately, most people do not have formal typing training. They cannot operate a QWERTY keyboard correctly and efficiently. When they encounter a task that requires keyboard typing, it is very common for them to rely on certain expediencies:

1. They hunt and peck on the keyboard, character by character.
2. They use less fingers to manipulate the keys.

We are entering the computer age. Computers are penetrating into all kinds of businesses, schools, and families. It is an urgent task to develop keyboards that are user friendly for the general public.

The present invention, discloses a pair of integrated new keyboards with modifications over the QWERTY keyboards. The new keyboard has some unique features related to keyboard ergonomics, typing efficiency, and user friendliness, etc.

An optimum keyboard must be capable of transmitting in excess of 3000 bits of information in more than 100 groups ranging from alphabets and graphic symbols to programming and mathematical operators. An optimum keyboard should also be capable of having information entered quickly and correctly; it should be suitable for use with all types of equipment requiring information transfer; and it should be easy to learn and operate. Furthermore, it should maintain a user's hands in the most natural position to avoid repetitive stress injuries (RSI).

The present invention provides this optimum keyboard. The basic design is created by resting a user's hands, palm down, on a sheet of paper and moving each finger naturally to define finger domain areas. Next the palm is supported to relax the arm muscles. Thirdly, a character assignment is chosen to minimize the learning curve such as A–L and Y on the left hand and M–X and Z on the right hand. All the capabilities of activating a control key with the palm and thumb are used with function keys, a joy stick, and a thumb-domain cursor controller. The term cursor controller represent a device that controls a moving indicator on the monitor, such as a trackball, touch pad and the like. The moving indicator is referred as a cursorial indicator in this invention. It represents arrow, pointer, pointed finger, sandclock, vertical bar, horizontal line, etc., depending on the software programs. The keyboard comprises a left quadrant and a right quadrant. The two keyboard halves are detachable for use individually, but they are usually set at an angle of 25° to 35° which conforms to the natural hand positions. The keyboard has one or more vertical columns for each finger and five or more horizontal rows. There can be an adjustment on the palm support to accommodate different-sized hands. Finally, a typing guide teaches the user how to use the keyboard correctly, efficiently, and in easy and friendly ways.

The closest known prior art is U.S. Pat. No. 4,824,268 (1989) to Diernisee H. V. His main objects for his invention are to have the fingers rest on, or reach, all the keys naturally on an ergonomically-designed keyboard with the majority of the fingers on each hand always located on the home keys so that inputting is easier learned, faster, accomplished with less effort, and generating less errors than on any other keyboard.

Another object of his invention is to have a number of keyboards with the minimum number of keys required to transmit the information and control bits each designed ergonomically to fit the irregular architecture of the hands and fingers of an individual or a group.

Another object of his invention is to arrange the symbols, operations, and control functions on the keys in such a manner that the keystroke efforts and response times are at a minimum and apportioned among the fingers and hands according to their dexterity, strength, and shape; and in such a manner that, whenever it is considered to be beneficial and possible, the maximum amount of sequenced entries is done by alternate hands; and, when that is not possible, to have the maximum amount of the remaining sequenced entries done by alternate fingers with the maximum amount of one-finger sequenced entries done so that one of the entries is located on a home key.

Another object of his invention is to have the most frequent information and control bit assigned to the home key of the most dexterous finger in its respective group with each next most frequent occurring bit assigned to the home key of each next most dexterous finger; and subsequently, to have each next most frequent occurring bit assigned to each next most easily reached key.

The keys of the Diernisse H. V. keyboard are irregularly arranged, without purposely using geometrical elements, to fit the architecture of the fingers and hands so that the fingers naturally rest on home keys and naturally reach all the other keys with a majority of the fingers of each hand always located on the home keys. In the preferred design, there is an imaginary dividing line down the middle of the board from the top to the bottom with each side having two or more groups of keys and other devices separated from each other.

The drawbacks to Diernisse H. V. include a lack of palm support, a lack of a thumb operated cursor controller, a lack of palm operatable keys, a lack of a palm-operated joy stick, and a lack of follow-through in aligning the rows and columns with the natural curvature of the fingers. Furthermore, Diernisse H. V. emphasizes a frequency based assignment of characters to the keys. The present invention improves the art by adding structure and simplifying the keyboard layout.

A summary of related prior art is listed below.

U.S. Pat. No. 3,929,216 (1975) to Einbinder discloses a keyboard having horizontal rows of 12 keys each. A specific character is assigned to each key based on frequency of use. Vertical columns have an arch to accommodate the curvature of the tips of the fingers.

U.S. Pat. No. 3,945,482 (1976) to Einbinder discloses a left-hand and right-hand split keyboard having curved key rows and slanted key tops of variable height to follow the architecture of the hand. It has a thumb-key row below the lowest letter-key row. The home-key row as 12 keys. No bell-shaped curve of rows is taught.

U.S. Pat. No. 4,332,493 (1982) to Einbinder discloses a keyboard having straight parallel rows and an efficient assignment of characters.

U.S. Pat. No. 4,579,470 (1986) to Casey discloses a multi-cluster keyboard layout to allow rapid finger motion and a natural positioning of the hands.

U.S. Pat. No. 4,715,736 (1987) to McGunnnigle discloses a process to determine optimum keyboard formats for a given language. Proposed keyboards have horizontal rows and slanted inward vertical columns.

U.S. Pat. No. 5,059,048 (1991) to Sirkin discloses a one-handed date-entry keyboard having columns and rows.

U.S. Pat. No. 5,119,078 (1992) to Grant discloses a V-shaped keyboard layout having straight rows.

U.S. Pat. No. 5,129,747 (1992) to Hutchison discloses a V-shaped keyboard having four rows.

U.S. Pat. No. 5,178,477 (1993) to Gambaro discloses a palm support and curvilinear mesa layout for a keyboard. The layout is generally a mirror image of the user's hand.

U.S. Pat. No. 5,318,367 (1994) to Bruan et al. discloses a hinged V-shaped keyboard.

U.S. Pat. No. 5,360,280 (1994) to Camacho et al. Discloses a U-shaped keyboard having elongated keys.

U.S. Pat. No. 5,367,298 (1994) to Axthelm discloses a one-handed data-entry keyboard.

U.S. Pat. No. 5,481,263 (1996) to Choi discloses a left- and right-hand keyboard having a palm rest and a concave array of keys.

U.S. Pat. No. 5,498,088 (1996) to Choate discloses a physically standard keyboard having a more efficient key layout and providing a smooth transition from the QWERTY layout.

SUMMARY OF THE INVENTION

The main aspect of the present invention is to provide a user-friendly ergonomic keyboard having a left and a right quadrant of keys, each quadrant having a palm rest, wherein each quadrant has a home row of keys conforming to the user's slightly flexed fingers and four rows of keys comprising an upper, middle, lower, and bottom row of keys.

Another aspect of the present invention is to provide a cursor controller in each thumb-domain area.

Another aspect of the present invention is to provide the palm rest with a joystick controller.

Another aspect of the present invention is to provide a keyboard assignment on the left quadrant of A through L and Y, and on the right quadrant of M through X and Z, wherein numeric and diacritic symbols are in the pinkie-domain areas.

Another aspect of the present invention is to provide one or more power reach rows of keys above the upper row.

Another aspect of the present invention is to provide a row of palm-operated key(s).

Another aspect of the present invention is to provide a key-designation change key to enable switching of one keyboard's designations to the others, thereby enabling one-hand typing.

Another aspect of the present invention is to provide an adjustable palm rest to accommodate different hand sizes, and to further provide a slidable palm rest to reach the power reach keys.

Another aspect of the present invention is to provide a circular array of keys for the thumb-domain area emanating from the cursor controller.

Another aspect of the present invention is to provide a pinkie-finger operated function key which allows the ring finger to depress other number key(s) in the pinkie-finger domain or the middle fingers to depress the letter keys) in the alphabetic blocks of the keyboard.

Another aspect of the present invention is to provide a circular motion sensor in a joypad to enhance computer games, etc.

Other aspects of the present invention will appear from the following description and appended claims, reference being made to the accompanying drawings forming a part of this specification wherein like reference characters designate corresponding parts in the several views.

Ergonomic Studies

Conventionally, keyboards are manipulated by fingers. The present invention optimizes the natural gestures of hands and fingers during typing by using each finger's accessible area in lateral movement and vertical movement. It also optimizes the availability of different portions of a hand to control those computer peripheral devices that are operated by hands.

These studies indicate:

1. Hand slope on the keyboard.

The ergonomic slope of hands and forearms when placed on the keyboard is approximately 25° to 35° from an imaginary front centerline of the body. This slope varies from person to person and also slightly varies between the left-hand side and the right-hand side. Therefore a pair of keyboards with left quadrant and right quadrant that can be detachable to suit the best comfortable slope of each individual keyboard user is suggested.

2. Lateral movement of fingers.

The area covered by each finger at its natural relaxing stretch position is referred to as its home domain. Move each finger outward laterally to its limit, the area covered is referred to as that finger's maximum domain. Halfway between the home domain and maximum domain is its extended domain. A finger may have one, two, or all three domain(s) depending on its relative position to other fingers.

The finger-domain studies suggest that the area within the extended domain can be accessed by the fingertip with less stress. Keys controlled by a finger should be placed within that finger's home domain and extended domain. Hereafter, each finger's ergonomically reachable area, i.e. the home domain and extended domain, is simply referred to as that finger's domain.

3. Vertical movement of fingers.

The five fingers on each hand vary in the finger's length, strength, dexterity in maneuverability and accessibility to key position. Each finger's natural vertical movement (i.e. stretch and flex) follows its finger's centerline.

Studies on the stretch and flex movement of the fingers suggest keys controlled by each finger should be arrayed vertically following each finger's centerline. In another word, keys, in a finger domain, should be stacked vertically into columns.

4. Home key location.

By slightly flexing the fingers in their most natural and comfortable gestures on a plan surface, the fingertips positions are ergonomic home key locations.

For ergonomic purposes, the home key row should be curved by following the irregular architecture of finger lengths. They should not be arrayed on a straight horizontal row.

5. Other key locations.

Other keys are added above and below the home keys, and are stacked vertically into columns. The number of keys that can be adequately stacked in each column depend the finger length and key size.

One key can be stacked above the home key and three keys can be stacked below the home key for the three middle fingers. The pinkie finger is approximately one finger segment shorter than the three middle fingers, it has one key less below the home key. Similarly, thumb can adequately controls three rows of keys.

Key size can be reduced by ¼ to ⅓ of the size of the standardized key without affecting the comfortness and accuracy in keystroke. The reduction on key size can only be made on the height but not on the width, the key width should remain equal to or greater than the width of each finger. Reduction of key height by ¼ can accommodate one extra row of keys on the keyboard. Reduction of key height by ⅓ can accommodate two extra rows of keys on the keyboard.

6. Regularity in key arrays.

A keyboard should have a distinctive organized column and row relationship. This is helpful for quickly and accurately locating the desired key in the keyboard and ease of memorization of a keyboard format.

The keyboard designs up to this stage have keys stacked into columns. However, there is no row relationship among the keys being built yet. An adjustment in connecting the key lines (i.e. key gaps) to correspond to finger heights results in smooth-curved curved row lines.

7. The thumb keys.

In a conventional keyboard, the two thumbs are mainly used to press a space bar. Thumbs are strong and dexterous fingers. A thumb tip can reach a large fan-shaped area in its planar motion. This fan-shaped thumb domain can accommodate many keys.

Each fan-shaped thumb domain can be partitioned adequately into three curved rows in four columns. The conventional cursor controller, e.g. trackball, operated by thumb is retained, however, there will be two, one on each hand-side, instead of one to increase the ease and versatility in controlling capabilities of the user to the software programs via the keyboards.

8. The palm operable keys.

The upper portion of the palm (anatomically, the distal ends of the metacarpals and the joints between metacarpals and phalanges) is capable of actuating keys by pressing down motion. Three palm keys can be adequately installed in this area, i.e., the palm key domain.

The location and the means of operation of the palm key is different from those keys in the finger domains. Since the palm keys do not interfere with the maneuverability of the five fingers to their keys, the palm key is suitable to be programmed as toggle-switch-type "ON/OFF" control keys; and eight different modes ($2^3=8$) can be generated by the three palm keys.

9. The integrated joypad.

The lower portion of the palm, although it is not suitable to actuate keys, can push things around. Also, a wrist (anatomically referred to as carpels) can twist a hand to rotate approximately 50°.

Ergonomically, providing a palm or wrist-supporting pad can make the typing work more comfortable and reduce fatigue. The supporting pad should not interfere with the operation function of the palm keys and finger keys, nor should it pinch or create any pressure on the wrist area.

Therefore, a palm-supporting pad which contours the lower portion of the palm being installed on each hand-side of the keyboard. The joystick can be integrated to the palm-supporting pad and can use the palm to push it around. A circular motion sensor is also attached to it and is operated by the rotary motion of the wrist. The mechanism of a rotary dialing telephone is one of the most commonly known circular-motion sensors. Hereafter, the integrated palm-supporting pad is referred to as a "Joypad". Again, the operation of the Joypad does not interfere with the maneuverability of the palm keys and the five fingers to their domains.

The present invention, has a pair of keyboards having a left quadrant and a right quadrant that are detachable and preferred being positioned at approximately 25° to 35° to the front body's centerline of a user. There are two sets of cursor controllers and integrated joypads, one set on each hand side.

10. The power-reach keys.

To make the typing work in a more comfortable and relaxing condition, the present invention prefers that the hands of the keyboard user are always resting on the palm-supporting pads, the joypad. To do this, keys are preferably located in the underside areas of the hands. Therefore, a user does not have to move the user's hand to reach a key. Since the number of characters is increasing by years, and characters to be assigned to the keyboard exceeds the underside areas the hand can accommodate, extra keys can be installed outside of these basic finger domains. The user may use his palm to slide the palm support pad (i.e. the joypad) to reach these keys. These keys are referred to as power reach keys. The user does not have to lift his hand from the palm supporting pad to reach a key during all the typing.

Character Arrangement Studies

1. Strategies in character arrangement.

Character arrangement is an important issue in keyboard design. It is the main issue to the present invention. Different styles of character arrangement have different objectives and backgrounds. We categorize the character arrangements into four basic strategies:

a. Finger jam strategy: The characters on the keyboard are arranged in such a way that they purposefully jam the typist's fingers to slow down the typing speed in order to reduce the chance of jamming the keys. QWERTY-style keyboards currently dominating the typewriter and computer keyboards markets are finger-jamming keyboards. The irregular character arrangement of QWERTY format also creates difficulty in keyboard memorization to typing beginners; it also jams the user's brain. Any irregular character assignment to the keyboard that may create difficulty in keyboard format memorization, such as QWERTY format, can also be referred to as a brain-jam keyboard format.

b. Frequency strategy: The character arrangements intend to increase the typing efficiency. The character assignments on the keyboard are mostly based on studies of 1) frequency of usage of characters; 2) the strength, dexterity, and accessibility of the five fingers to the keys in different keyboard locations; 3) the effective means to actuate keys in a faster speed. Keyboard formats of this type are better than QWERTY-styles efficiency-wise. However, the unorganized character assignments are brain-jammers.

c. User-friendly strategy: Characters are arranged in such a way that it can speed-us keyboard format memory easily by a user's brain. For example, letter and number arrangements following the alphabetic order and numeric sequence are most likely to be user friendly. Character arrangements that follow certain organized logic may allow a user easily and quickly locating a desirable key and eliminate the hunt-and-peck.

d. Customized strategy: This strategy provides a programmable keyboard. A user can assign any character to any key that he wishes. This type of keyboard is more personalized and offers more options to a user. A user has the option to select a keyboard format from a set of standardized formats, i.e., QWERTY, Dvorkok (U.S. Pat. No. 2,040,248), AS Red Hot (U.S. Pat. No. 5,498,088), or the Scientific format (U.S. Pat. No. 4,715,736), etc.), or a user can create his own keyboard format to suit his specific needs.

2. The group-block strategy in character arrangement.

The present invention intends to design keyboards which are user friendly so that they will be easily accepted by the general public. In the designing processes, the ergonomics and typing efficiency also need to be taken into consideration so that the keyboard will also be accepted by the professional typists.

To achieve the above three goals, a user-friendly group-block strategy is designed. The group-block strategy combines the merits of both frequency strategies and user-friendly strategies.

The groups:

Characters to be assigned to the keys are classified into groups based on their function. And the priority orders of different groups is rated based on the frequency of usage of each group.

The blocks:

The priority of each key location is also rated based on the accessibility of the key to the finger that controls the key. The accessibility and other criteria are for preparing to partition the keyboard into different sectional blocks. Different groups of characters assigned to different blocks on the keyboard, based on the priority criteria starting with the most frequently used character group in a program e.g. English alphabets) is assigned to the most easily accessibly keys controlled by the most strong and dexterous fingers as a block, and so on. A most frequently used character group is a preference of a user. The sizes of the blocks varies depending on the number of characters in the group. A group can be split and assigned to more than one block in any organized manner if the character numbers in that group are too large for a block to accommodate it. If a group of characters do not have a public recognized order, the character assignment will take user-friendliness as priority; and assisted by other considerations such as the frequency of usage, finger accessibility, characters which are in pairs, symmetry or similarities in shape, the co-operative relationship etc. These considerations will determine the key locations of a character that is situated in the block and the characters that are assigned adjacent to it.

Although the term of the group-block strategy is newly invented, the concept is old. In certain areas in the QWERTY-style computer keyboards, the characters are assigned in accordance with the group-block concept.

An alphanumeric arranged keyboard should not be considered as naive; it can be a cleverly organized arrangement with simplicity. Similarly, the alphanumeric arrangement of index cards in a library for quick and efficient locating of a book has never been considered as a naive arrangement. Also, it is irrelevant whether the letters or numbers on a keyboard are arranged by following the alphanumerical order, horizontally or vertically, in continuous style, or in splitting-into-segments style, as long as the final results of the data displayed are in correct order as the user expected. On recollecting the QWERTY-style character arrangement which purposefully jam the user's brain and fingers, however, the final results of data displayed are usually correct and are as the user expected.

3. The character arrangements in single-hand keyboards.

Single-hand typing has become normal in today's working environment. This working background provides the market that needs well-fitted single-hand keyboards to replace the single-hand typing on the QWERTY-style keyboards.

The underside area of a hand has a limited space in accommodating keys; a typical computer keyboard has more than one hundred keys. Although many keys can be eliminated, (such as the duplicate set of number keys, many numbered function keys F1 through F14, and lettered function keys can be replaced by a keyboard software program), characters that are needed to be assigned to the keyboard are still far exceeding the number of keys that can be placed in the underside space of a single hand.

To accommodate more characters in a single-hand keyboard, it requires:

1) more control keys, i.e. shift-hand key, shift-case key, different mode keys, keys that control co-operative functions;
2) reduce the key size to accommodate more rows of keys (preferably the height of a key reduced by ¼ to ⅓);
3) install more keys in the power-reachable area, the areas that are reachable to the fingertips with the slide-guiding power of the joypad.

The present invention comprises a pair of ergonomic keyboards which are detachable to suit the single-hand operative purpose. It takes all three above described requirements into consideration. This is a better alternative than designing keyboards specifically for single-hand operation.

Typing Guides

Typing is a brain-to-hand co-ordination action. To be able to type, firstly, the brain has to memorize the location of the key on which the correct character is situated. Secondly, the brain has to instruct the correct finger to strike the key. Thirdly, an instant awareness if an incorrect key is actuated.

In order to help user to accomplish the above described brain-to-hand co-ordination actions in simple, easy, correct, and efficient ways, some user friendly typing guides have been designed.

1. In order to help the beginning users to locate the correct keys quickly, keyboard format of different character groups can be posted on the monitor frame for quick review at a glance.
2. In order to guide the user the correct finger to strike a key, keys in different domains are color-coded following the rainbow color order.
3. In order to alert the users of typos, an on-screen keyboard format image can be displayed in the same visual field to the cursorial indicator of a main program. The keyboard image moves along with the program cursorial indicator. Keys or characters in the on-screen image can be highlighted when corresponding keys on the keyboard are actuated. This can provide an instant visual alert of typos when they occurred.

In fact, an on-screen keyboard format image alone, with the aids of programmed audible and visible alerts, can serve all the above-mentioned typing guiding purposes adequately and efficiently.

For those typing beginners, there is a simple, easy, and efficient typing-practice shortcut. The first step is to use just the three middle fingers for the high-frequency blocks, a block of keys on each quadrant keyboard reserved for the most commonly used characters in a specific language or program, such as English alphabets. After the users are familiar with the high-frequency keys, adding other key strokes outside the high-frequqncy blocks will be relatively easy.

The ergonomic part of this keyboard is designed based on anatomical studies of the forearms, hands, and fingers and their natural streamline movements on the keyboard. The results of the studies describe that when placing both hands upon the keyboard, the angle for least stress on the hands and forearms is 25° to 35° from the center of the body. Therefore, the keyboard should have a separate left-hand side and right-hand side. Both hands rest at an angle of 25° to 35° allowing for a lesser amount of tension in the hands and forearms. The keys pressed by each individual finger are aligned to allow for natural streamline motion. This improved design significantly reduces the strain produced from typing on a standard keyboard.

With the hand held palm side up, a line is drawn along the center of each finger, then each finger is stretched and flexed. This motion shows that each finger moves along the drawn center line. The keys controlled by each individual finger are aligned to facilitate this natural movement.

When viewed with the hand palm side up, one can see the five fingers are not equal in length.

1) The pinkie finger is one-finger segment shorter than the ring finger.
2) The ring finger is approximately ⅓ to ¼ segment shorter than the middle finger.
3) The middle finger is the longest and is approximately in the center line of the hand.
4) The index finger is approximately ½ to ⅓ segment shorter than the middle finger.
5) The thumb is in the lowest position. Its tip reaches to only ½ of the last segment of the index finger.

When the length between the pinkie finger and the middle finger is compared, the pinkie finger is approximately ½ the height of the middle finger. With the pinkie finger slightly curved to fit the home-key position, it becomes even shorter than the middle finger. On [the] a standard keyboard, the horizontal rows line up evenly with the pinkie finger curved to fit on the home-key position. The other three fingers have to flex extensively to match up to their home-key positions. The added stress with this standard design makes the middle fingers flex extensively to reach the home keys. The present design is a better-suited keyboard which allows for smooth and natural finger strokes. To do this, the home-key position for all of the fingers is not on the same horizontal row.

The strategy behind this improved ergonomical keyboard follows the following procedures:

1) Place a user's hands on a large sheet of paper, and position them in a comfortable typing position.
2) Draw the outline of the forearms, hands, and fingers on the piece of paper.
3) Draw a vertical line between the two hands to the center of the user's body.
4) Draw a center line through each forearm continuing through the middle finger until this line intersects the central vertical line creating an angle and a slope.
5) The slope of this line is the ergonomical-keyboard slope. The angle can be slightly different between left forearm and right forearm. Also, angles will vary from person to person. Usually the angle is between 25° to 35°.
6) Slightly flex the fingers to create a comfortable home-key position, and draw a short horizontal line above and below each fingertip to form a block. These blocks are the home-key positions.
7) Similarly, flex and stretch the fingers to create the upper-, middle-, lower-, and bottom-key positions.
8) Draw outline blocks around the home-key position and the upper-, middle-, lower-, bottom-key positions. Similarly, more rows of keys can be created above the top row or below the bottom row if desired.

9) Make these blocks follow a curved alignment (i.e., they will not be in a straight horizontal line) to build a new row relationship. In other words, keys on the upper row, home row, middle row, lower row, and bottom row will be in a curved alignment not all straight in horizontal rows.

10) The outline of the pinkie finger is called the pinkie finger's home domain. Extend the pinkie finger outward to the maximum limit, and draw an outline around the pinkie finger. The area inside the line is called the pinkie finger's maximum domain. Place the pinkie finger half way between its home domain and maximum domain, and draw an outline around the pinkie finger. The area inside the line is called pinkie finger's extended domain. All areas within the pinkie finger extended domain inward is simply referred to as pinkie-finger domain.

11) The ring finger domain includes its home domain and extended domain. The ring finger extended domain is the area above the pinkie finger tip. This is an area the pinkie finger cannot reach, but the ring finger can easily reach it sideways.

12) The middle finger has only the home domain.

13) The index finger can extended outward like the pinkie finger. Similarly, half of its maximum domain is its extended domain. Together, the extended domain and home domain make up the index-finger domain. This finger can control two columns of keys.

14) Draw an outline of a thumb in the resting position. This area is called the thumb-home domain. Stretch the thumb outward to its maximum distance. Draw an outline of the thumb. This area is the thumb's maximum domain. Halfway between the home domain and maximum domain is its extended domain. The thumb can also flex inward easily. A relative larger area from the thumb-extended domain inward is called thumb domain. In this area, keys can be reached by the thumb quite comfortably. Since this area is shaped like a quarter circle, it is also named thumb-quarter domain. The thumb keys are arranged along a curve to follow the thumb's natural movement. They are not aligned in vertical blocks or horizontal bars or blocks.

A cursor controller, such as a trackball, is integrated into the keyboard. It is located at the thumb-home position in the area of thumb-home domain. There are two cursor controllers in this invention. Each thumb controls one cursor controller.

The cursor controller acts as a resting place and support for the thumbs. Resting the thumb on the cursor controller will not activate the cursorial indicator on the screen. Activation of the cursorial indicator only occurs when the cursor controller's control key which is located in the palm area below the pinkie-finger domain is pressed.

Using the cursor controller as the thumb's resting place is unique to this keyboard design. This feature helps to decrease the stress on the other four fingers. Another unique feature is having a cursor controller's control key located in the easily accessible palm area below the pinkie-finger domain (i.e., pinkie-finger palm key).

The keyboard design has a row of palm keys in the palm key domain. The first one is the cursor controller's control key located below the pinkie-finger domain. The second is located below the middle- and ring-finger domains. The third one is located below the index-finger domain. These keys are programmable keys and can be programmed as toggle-switch type ON/OFF mode keys.

The palm rest pad (i.e., joypad) feature is unique to this invention. Standard typing technique suggests strict posture with hanging forearms and fingers anchored on the home keys. This position is necessary to reach all of the keys. However, it is also ergonomically incorrect. This position results in stress and tension in the neck, shoulders, arms, and hands. For people who type constantly, such as secretaries, writers, and computer programmers, etc., this stress is an occupational hazard. There are some products on the market that relieve this tension. Rubber or sponge-like wrist pads are available.

On this keyboard, a specially designed palm pad is used to prevent hand and wrist fatigue. This pad also doubles as a joystick controller. The users can use the palm-rest pad as they would a joystick. Thus, a new term, "JOYPAD", is coined. The shape of the joypad is contoured to fit the shape of the palm. In this way, it is both comfortable for resting and when in use as a joystick. The joypad has an adjustable screw so that it can be adjusted to the individual's hand allowing for a comfortable reach between the pad and the home keys.

The important features of the new joypad include:
1) Both hands are always resting on the joypad. This gives support to the wrist and hands which decreases fatigue. All finger operable keys, palm operable keys and controllers, (i.e. alphabets, numbers, cursor controllers, joystick, circular motion sensor, etc.) are within an easily reachable distance.
2) This design style allows for "three-point positioning". It is advised to keep at least one finger in the home position to allow other fingers to find their home position again after a keystroke. This is called "one-point positioning". In this design, the palm always rests on the joypad and the thumbs on the cursor controller. The pinkie finger stays in its home key. With the aid of this three-point positioning, accuracy and efficiency are increased and tension and strain are reduced.

A circular motion sensor can be integrated into the joystick base. Basically, the joystick moves along the X and Y axis (i.e., forward, backward, side-to-side) with any two or more combinations (i.e., forward right, then backward left, etc.). The joystick cannot perform rotary motions. Since the wrist can perform rotation movement easily (approximately 50°), a circular motion sensor is integrated to the joystick base. This enables the joypad to make smoother functions and easier to control. Circular motion sensor enhances computer games by making them more vivid, dynamic, and exciting.

The present invention also provides keyboard formats based on the ordered layout strategy, the group-block strategy. The ordered layout keyboards are better and more practical because of the unsuccessful experiences with the frequency keyboard strategy.

In the ordered-layout keyboard taught here, two different styles of formats can be provided:
1) Horizontal formats can be used for Western cultures (U.S., Europe, etc.)
2) Vertical formats can be used for Eastern cultures (China, Japan, etc.).

We teach two horizontal keyboard arrangements:
1) The alphabetical arrangement starts on the left and continues across the keyboard to the far right.
2) The other arrangement splits the alphabets in two with letter A–L and Y keys on the left side and M–X and Z keys on the right side.

We also teach vertical-keyboard formats for languages or phonetical symbols written in vertical form wherein a vertical-keyboard format would be beneficial. Any language, alphabet, or pronunciation can be arranged in vertical-key order as desires. This works especially well when the key arrangement shows a logical pattern which aids in memorization.

Another option would be for the user to organize the arrangement of the characters himself to best suit his needs.

In the horizontal-split alphabet keyboard, character arrangement in the keyboard follows the alphabetic order but split into two halves, one on each hand side in alphabetic order. The advantages of this type of keyboard include:

1) Easy to memorize.
   a) keys still arranged in alphabetic order and easy to memorize.
   b) A–L are on the left side, M–X are on the right side.
   c) the vowels A, E, I line up in the same column on the left side.
   d) the vowels O and U line up diagonally with the letter R between them.

2) Still retains the high frequencies.

The letters with high frequencies of usage are still retained on the home row (with the exception of Q):

| Upper row keys/<br>Frequency of use | A | B | C | D | M | N | O | P | Totals (%) |
|---|---|---|---|---|---|---|---|---|---|
| Milliken | 7.3<br>2.7 | 0.9 | 3.0 | 4.4 |  | 2.9 | 7.8 | 7.4 | 36% |
| McGunnigle | 8.2<br>2.0 | 1.4 | 2.8 | 3.7 |  | 2.5 | 7.1 | 8.0 | 35.7% |
| Home row keys/<br>Frequency of use | E | F | G | H | Q | R | S | T | Totals (%) |
| Milliken | 13<br>9.3 | 2.8 | 1.6 | 3.5 | 0.3 | 7.7 | 6.3 |  | 44.5% |
| McGunnigle | 13.1<br>10.3 | 2.9 | 2.0 | 5.3 | 0.1 | 6.8 | 6.1 |  | 46.6% |
| Lower row keys/<br>Frequency of use | I | J | K | L | U | V | W | X | Totals (%) |
| Milliken | 7.4<br>0.5 | 0.2 | 0.3 | 3.5 | 2.7 | 1.3 |  | 1.6 | 17.5% |
| McGunnigle | 6.4<br>0.2 | 0.1 | 0.4 | 3.4 | 2.5 | 0.9 |  | 1.5 | 15.4% |

The letter frequencies of home row (44.5–46.6%)> upper row (35.7–36%)> lower row (15.4–17.5%). This row frequency of character priority coincides with both Milliken's and McGunnigle's studies showing a balanced ergonomical distribution.

3) Increased efficiency:
   a) Key strokes are performed mostly by the index, middle, and ring fingers which are also the strongest fingers.
   b) The keyboard design provides three rows of alphabetic keys. The upper and middle rows of keys are positioned in close proximity to the home row allowing for an easy reach.

In a short word, all alphabets are lined up only in three rows and manipulated by only three middle fingers. Operating a standard QWERTY-style keyboard to type alphabets requires all four fingers (i.e., includes the pinkie finger). In a standard keyboard, there are certain keys that are relatively difficult to reach by the fingers. This makes a little sense in arranging characters by frequency. In this invention, all letters are in three horizontal rows (next to each other) and all letters are manipulated by three most easy typing fingers (index, middle, ring). Therefore, all letters are almost equally easily accessible. Under this condition, it makes no sense to consider the frequency strategy, because it is as bad as QWERTY in learning (i.e. memorization).

4. Provide an easy method of single-hand typing.

This is a unique function of the horizontal-split alphabet keyboard. Its advantages are described below:

Standard typing involves using two hands on the keyboard. With current technology, it is possible to program a keyboard for single-hand use. Single-hand typing can be designed in the following way:

a) All alphabetical characters and essential punctuation can be placed on a single-hand keyboard (e.g., left-hand side of keyboard only). FIG. 37 is an example of a single-hand keyboard with a complete set of English alphabets and numbers on the keyboard. Usually a standardized key covers an area of approximately 2 cm in square or rectangle. Based on measurements taken from fingerprints, the surface area on single key can be reduced by ⅓ (height, not width), therefore, allowing the placement of more keys on a keyboard. Also, a smaller key reduces the distance traveled between keystrokes allowing for faster and smoother typing. With the reduction of size of the individual keys, it is feasible to have a single-hand keyboard with more than 50 key panels. The palm key, joypad, and cursor controller will also increase keyboard functions.

b) Split the alphabet in two halves. The first half is orderly arranged on the left-hand side of the keyboard, the second half of the alphabet is orderly arranged in the right-hand side of the keyboard, i.e., half of the alphabet (A–L and Y), numbers (0–4), and a set of punctuation marks are programmed to be "the first-hand panel". Another half of the alphabet (M–X & Z), numbers (5–9), and a set of symbols are programmed to be "the second-hand panel". The characters on the second-hand panel would be accessed by using a special function key (i.e. a shift-hand key, FIGS. 38–39) along with pressing one of their keys. Release of the special function key returns to the first-hand panel. For single-hand typing, the alphabet is split in two formats, the split into two halves FIG. 24) which assign A–L & Y on the first-hand panel and the M–X & Z on the second-hand panel, is easier to memorize than the continuous-alphabet format (FIG. 28) which is split A–D, I–L, Q–T on the first-hand panel and E–H, M–P, U–X on the second-hand panel. A vertical-order keyboard can be used for single-hand or two-hand manipulation. Key assignments can be made from left to right or right to left.

It is irrelevant if the letters on a keyboard are arranged following alphabetic order horizontally or vertically as long as the final results of the data displayed are in correct order as the user expected.

The idea of inventing a user-friendly single-hand keyboard is: "don't tie up both hands to do the typing job when a single hand can do the job efficiently". In today's working environment, it is very common for a keyboard user to carry out many different tasks simultaneously, including 1) log-in to a computer to check information; 2) answer telephone calls and take hand notes; 3) search for documents on the desk or in the file cabinets etc. This type of working environment has become the norm and has created the need for designing a user-friendly, ergonomic, and efficient single-hand keyboard. In addition, a single-hand keyboard can save valuable desktop space. A single-hand keyboard takes up approximately only ¼ to ⅓ the desktop space compared to the conventional keyboard currently marketed.

Description of Numerical Key Arrangement:

Traditionally, numerical keys are arranged in order at the top of the keyboard or to the right side in a ten-key pattern. When placed at the top of the keyboard, it is a far reach to the keys from the home position. At times it is necessary to lift the entire hand to reach the number key desired.

The present invention's pinkie-finger domain has six blocks (i.e. keys) available. This is an ideal place to put the numeric keys. 0, 1, 2, 3, 4 are on the left-hand side. Assignments start from the home key in counter-clockwise order. 5, 6, 7, 8, 9 are on the right-hand side. Assignments start from the home key in clockwise order. At the bottom of the pinkie-finger domain is a key reserved to be the computer function key (Fn). Using the computer function key (Fn) along with press number key(s) will activate a computer function number code (i.e., Fn1, Fn2, Fn3, etc.). Using the computer function key (Fn) along with press letter key(s) will activate certain user friendly letter function codes (i.e., Fnhelp, Fnsearch, Fndelete, etc.).

Description of Key Arrangement Within a Thumb Domain:

As described in the finger-domain studies, a thumb-domain is a quarter-shape area. The tip of a thumb has a wide reachable area. Key positions should be arranged to optimize the flexibility of the thumb. The shape of the keys and their position should follow a curved line. Therefore, for optimal ergonomics, the thumb keys should not be on a strict horizontal line (like the space bar is on a standard typewriter keyboard), nor should it be a strict vertical bar.

Since a thumb is strong and flexible, it also controls a relatively large domain area. The present invention takes full advantage of it and fully develop its potential. To do this, two patterns of key arrangements are designed for the thumb domain.

1) Thumb-curved key cluster: Two or more rows of curved keys controlled by a thumb.
2) Thumb circular-array key cluster: Keys around cursor controller and controlled by a thumb.

Description of a Thumb-Curved Cluster:

1) A cursor controller in the thumb-home position is surrounded by four adjacent curved thumb keys.
2) A curved line follows the thumb's curved movement and across the center of the cursor controller and is defined as a curved thumb's home line. This line delineates a curved upper row and a curved middle row of keys in the thumb domain. A curved lower row of keys is below the curved middle row in the thumb domain.
3) A space key is positioned on the middle row and outward next to the cursor controller and it is curved to follow the natural movement of thumb.
4) A shift-hand key (i.e., shift between first-hand panel and second-hand panel if user wishes to be a single-handed typist) is positioned on the inward side of the middle row next to the cursor controller. When using the single-hand keyboard, this key switches the keyboard format from one hand panel to the other hand panel.
5) A shift-case key is positioned above the shift-hand key. These two keys can be actuated simultaneously by a single key stroke of a thumb to get upper-case characters of the other hand panel.

Description of a Thumb Circular-Array Key Cluster:

Thumb keys are arranged around the cursor controller in a circular arrangement. The thumb is anchored on the cursor controller, wherein touching one of the keys around the cursor controller will activate it. A user does not have to lift up his/her thumb and press the key. With the palm resting on the joypad and the thumb resting on the cursor controller and the pinkie finger resting on its home key, keystrokes are smoother and hand and wrist fatigue is reduced.

BRIEF DESCRIPTION OF THE DRAWINGS

The file of this patent contains at least one drawing executed in color. Copies of this patent with color drawings will be provided by the Patent and Trademark Office upon request and payment of the necessary fee.

FIG. 7 is a traced left hand with fingertip imprints to determine the optimal ergonomic key locations for each finger.

FIG. 8 is a left-quadrant keyboard design based on the studies of FIG. 1–FIG. 7 and redesigned keys with distinctive organized column and row relationship.

FIG. 9 is a traced left hand with palm imprint superimposed on it showing the position of palm keys.

FIG. 10 illustrates the curved array of palm keys.

FIG. 11 is a side plan view of the palm keys.

FIG. 13 is a top perspective view of a hand resting on a joypad.

FIG. 14 is a side plan view of the hand resting on a joypad.

FIG. 15 is a joypad with a horizontal section line and a vertical section line.

FIG. 16 is a side plan view of a joypad sectioned along the horizontal section line.

FIG. 17 is a side plan view of a joypad sectioned along the vertical section line.

FIG. 18 is a joypad comprising a joystick capable of X and Y direction movement and a circular-motion censor capable of circular movement.

FIG. 19 is a top perspective view of a hand on a joypad sliding to a forward direction.

FIG. 20 is a top perspective view of a hand on a joypad in the joypad's home position.

FIG. 21 is a top perspective view of a hand on a joypad sliding to a backward position.

FIG. 23 is a top plan view of a left-quadrant keyboard of the preferred embodiment comprises a circular-array key cluster in the thumb domain.

FIG. 24 is a plan view of a template of the circular-array key cluster.

FIG. 25 shows three enlarged circular-array keys.

FIG. 26 is a side plan view of the circular-array key cluster.

FIG. 41 is a diagram of a pair of keyboards with some user friendly training guides.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DESCRIPTION OF THE PREFERRED EMBODIMENT

Figure 1:
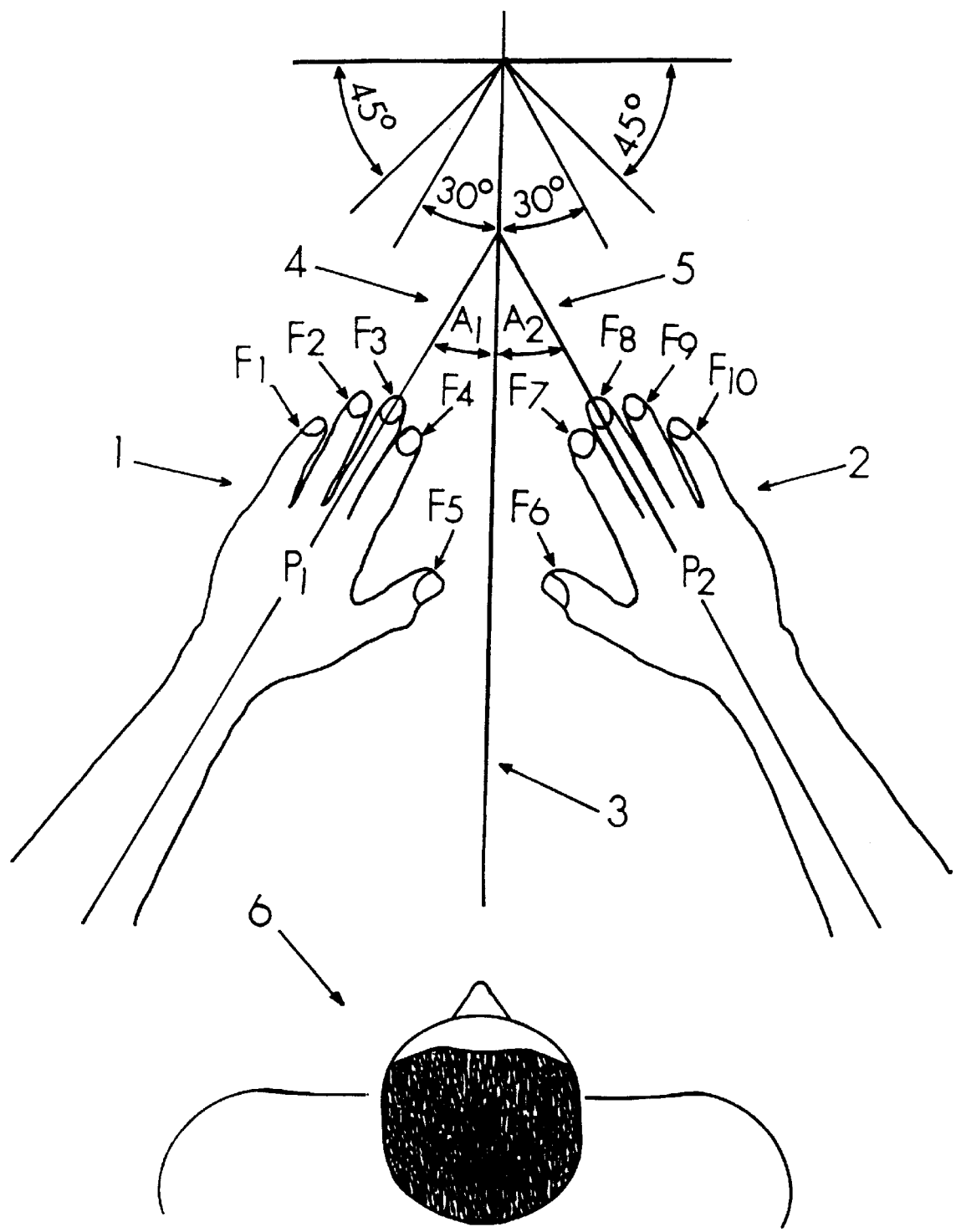
FIG. 1 is a top plan view of a pair of hands in their natural palm-down position.

Referring first to FIG. 1 a top plan view of a pair of hands in their natural palm-down position. A user 6 has a body centerline 3 projecting outward from the user's body. Left hand 1 and right hand 2 each have a centerline 4, 5 respectively. When the hands 1, 2 are held as shown in their natural outstretched position, the hand centerlines 4, form angles $A_1$, $A_2$ with centerline 3. Angles $A_1$, $A_2$ range from 25° to 35°.

Palms are assigned as $P_1$ (left palm) and $P_2$ (right palm), fingers are numbered as $F_1$, through $F_{10}$ starting at the pinkie finger $F_1$ on left hand 1 and are assigned in order to pinkie finger $F_{10}$ on right hand 2.

Figure 2:
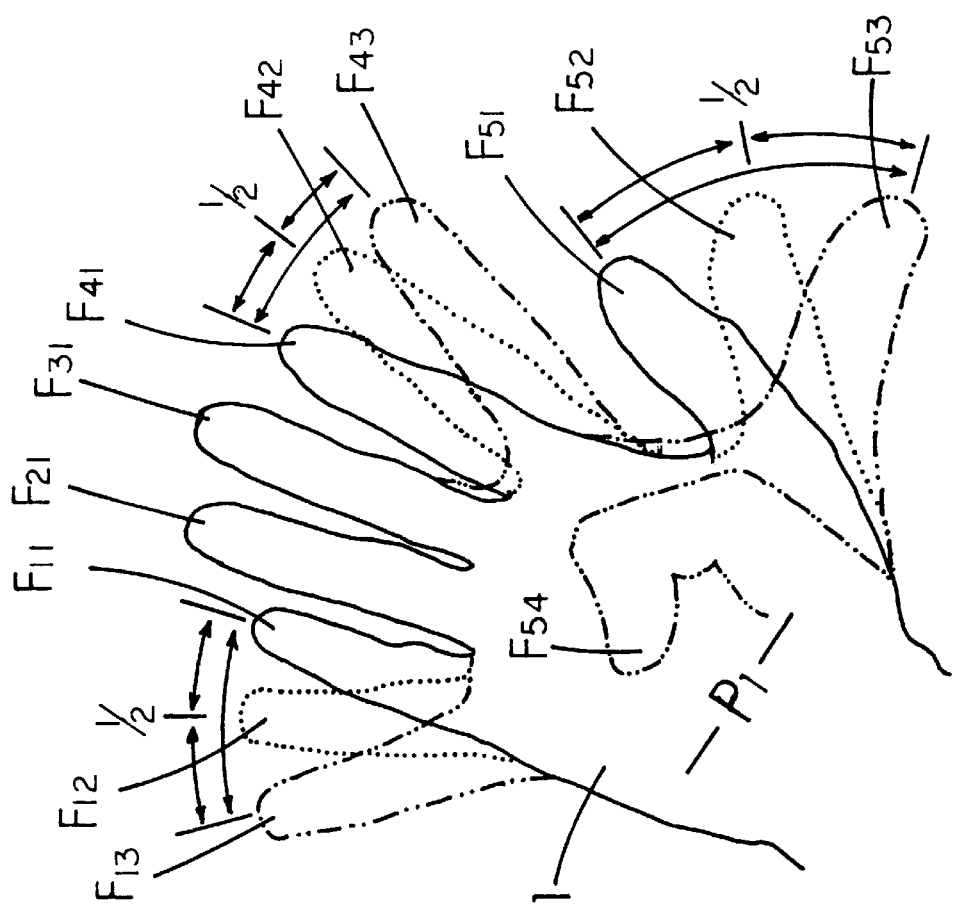
FIG. 2 is a left hand in palm-down position showing lateral movement of each finger.

Referring next to FIG. 2 an outline of a left hand 1 is traced showing how finger domains are determined. Finger domains are used to designated areas controlled by or accessible to each finger without moving the left hand palm $P_1$. Finger outlines $F_{11}$, $F_{21}$, $F_{31}$, $F_{41}$, $F_{51}$ show the fingers in their natural relaxed and stretched positions. These are the home domains. By moving each finger outward to the maximum limit and drawing an outline around the finger, an area inside the line is called its maximum domain. Half-way between its home domain and maximum domain is the extended domain. The home domain is the most natural position for each finger. An extended domain can be reached by its designated fingertip with less stress. An area within a finger's maximum domain but outside its extended domain can be reached by the fingertip, but only with some exertion. Due to the ease of movement, an area from the home domain to the extended domain of a designated finger is an ideal location for assigned keys. For example:

$F_{11}$ is the pinkie-finger's home domain, $F_{13}$ is the pinkie finger's maximum domain, halfway between the home domain and the maximum domain is its extended domain $F_{12}$. $F_{41}$ is the index finger's home domain, $F_{43}$ is its maximum domain, and $F_{42}$ is its extended domain. $F_{51}$ is the thumb's home domain, $F_{53}$ is its maximum domain and $F_{52}$ is its extended domain. Keys located in the home domain are in the best ergonomic position. Keys located between home domain and extended domain are in a good ergonomic position. Keys located outside the extended domain are accessibly by the fingers but are not ergonomically positioned.

Figure 3:
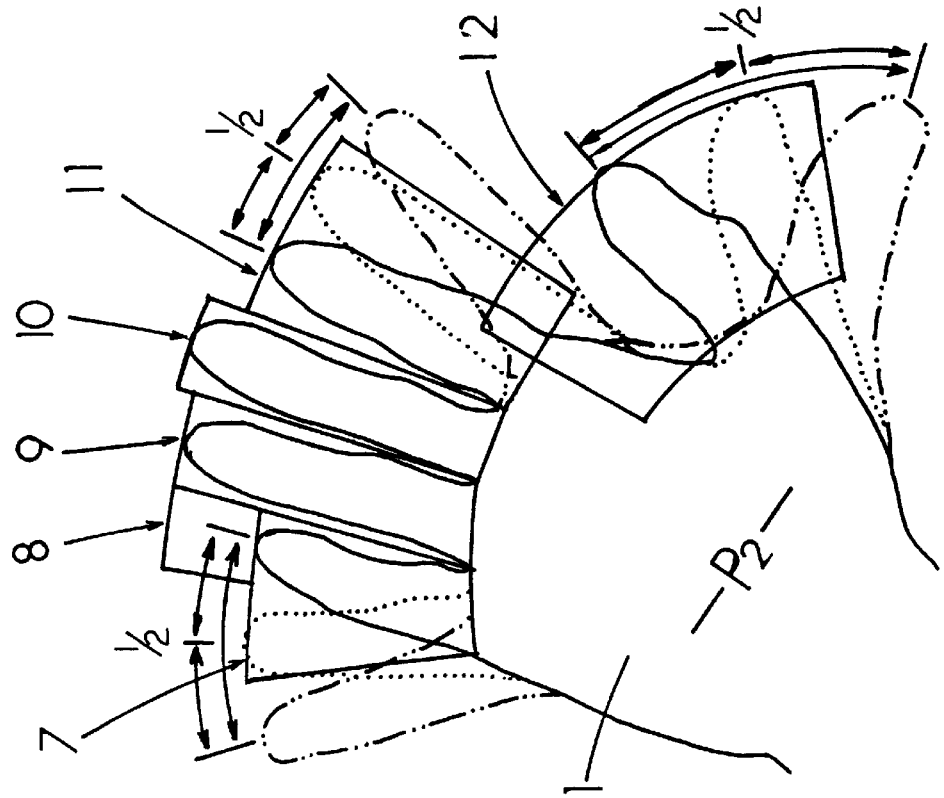
FIG. 3 is a left hand in palm-down position showing the finger domain's assignment base on the studies of the FIG. 2.

Referring next to FIG. 3 a top plan view of the left hand shows finger domains illustrated in FIG. 2. The pinkie-finger domain is area 7. The ring-finger domain is area 9 with an extended ring-finger domain 8. The middle-finger domain is area 10. The index-finger domain is area 11. The thumb domain is area 12.

Figure 4:
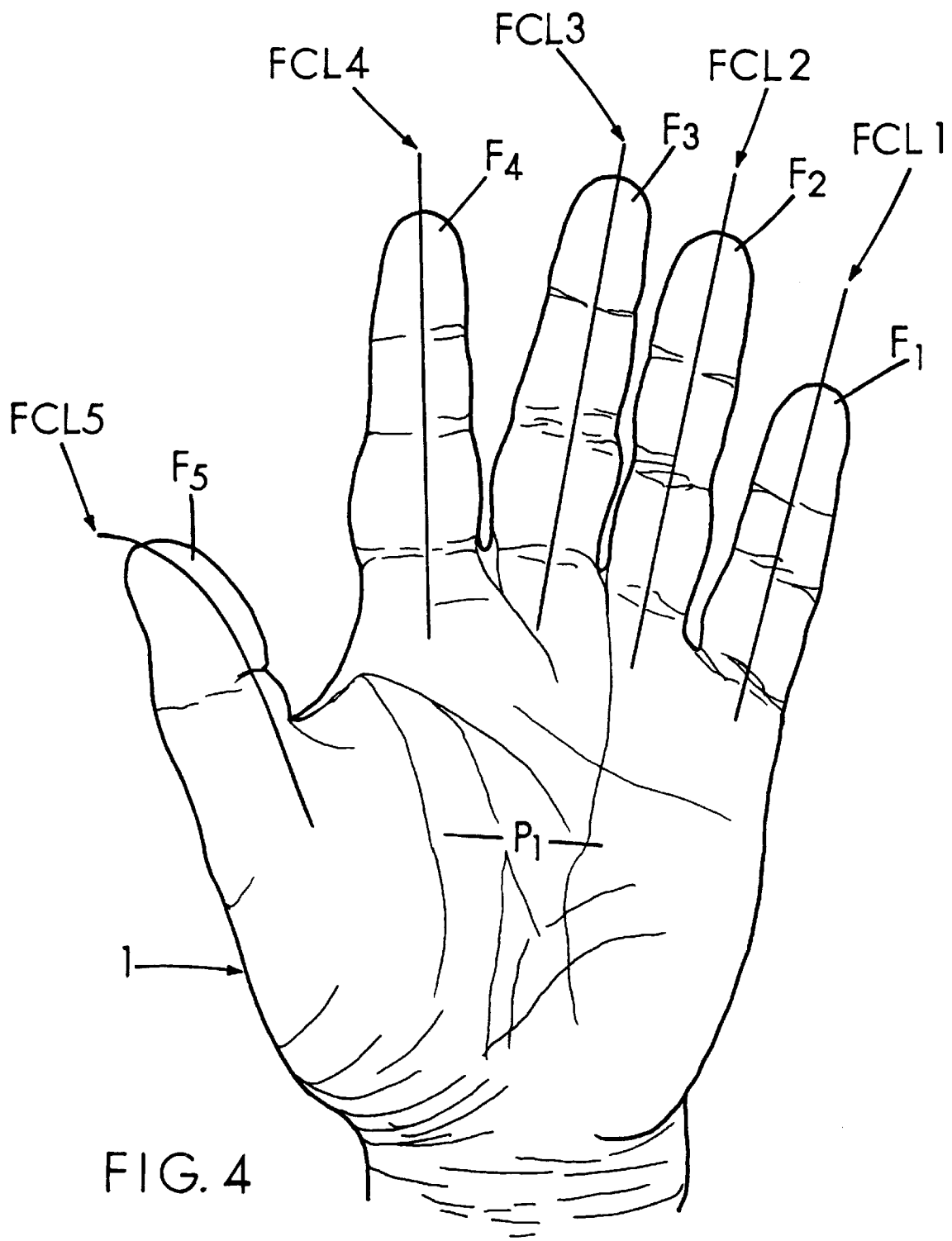
FIG. 4 is a left hand in palm-side-up position showing the centerlines of each finger.

Referring next to FIG. 4 a plan view of a left hand with palm-side up shows finger centerlines $FCL_1$ through $FCL_5$ corresponding to fingers $F_1$–$F_5$ respectively. Centerlines $FCL_1$ through $FCL_5$ show each finger's natural movement along its respective centerline. The keys controlled by each individual finger are aligned with each centerline to facilitate this natural movement.

Figure 5:
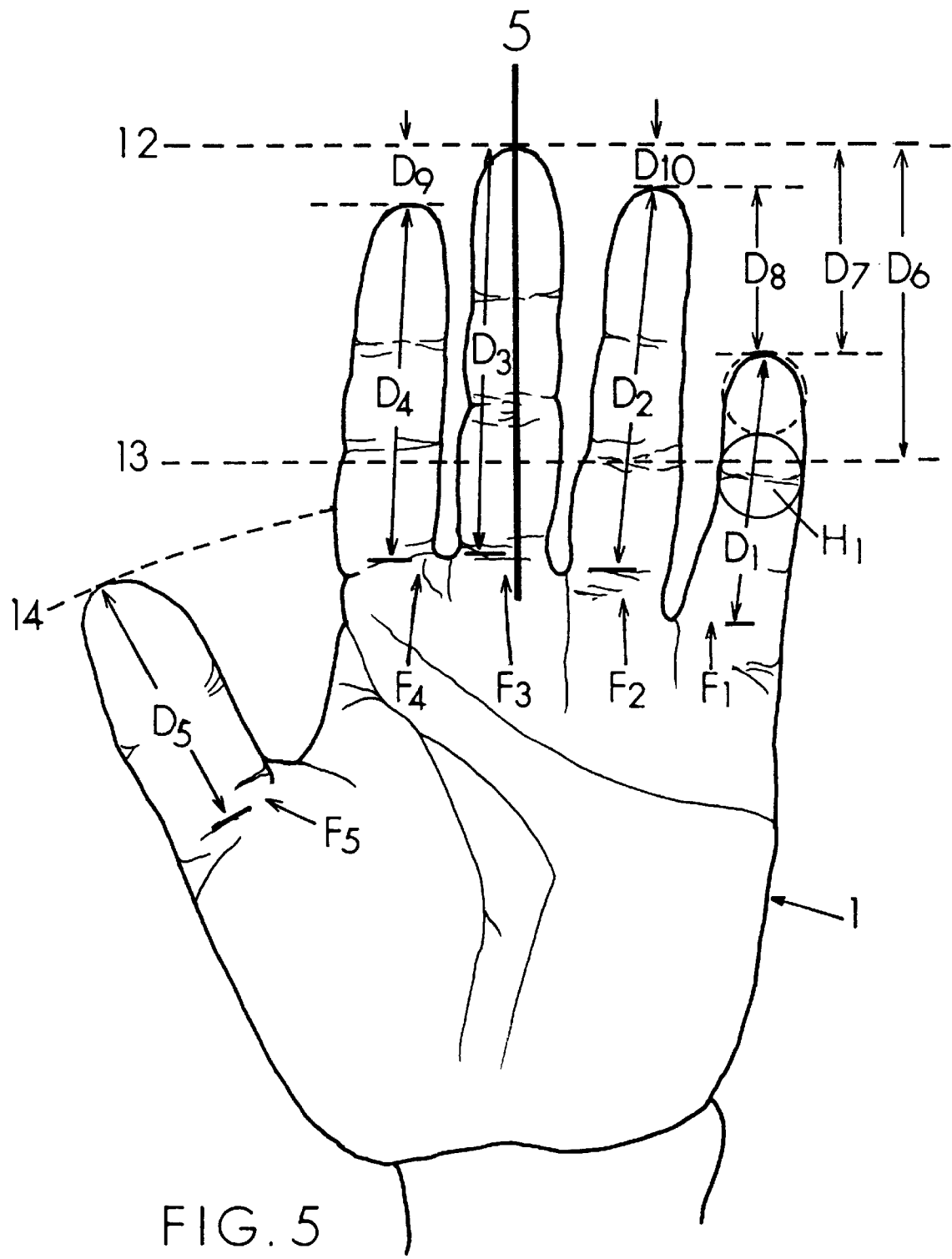
FIG. 5 is a left hand in palm-down position showing varying finger lengths.

Referring next to FIG. 5 a top plan view of a left hand with palm side up shows varying finger lengths. Finger joints are shown to indicate the relative position of each finger to other fingers.

The five fingers $F_1$ through $F_5$ in a hand are, generally, not equal in length.

1) A pinkie finger $F_1$ is approximately one-finger segment shorter $D_8$ than a ring finger $F_2$.

2) A ring finger $F_2$ is approximately ⅓ to ¼ segment shorter $D_{10}$ than a middle finger $F_3$.

3) A middle finger $F_3$ is the longest and is approximately on the center line 15 of the hand.

4) A index finger $F_4$ is approximately ½ to ⅓ segment shorter $D_9$ than a middle finger $F_3$.

5) The thumb $F_5$ is in the lowest position. Its tip reaches to only ½ of the last segment of the index finger $F_4$.

Figure 6:
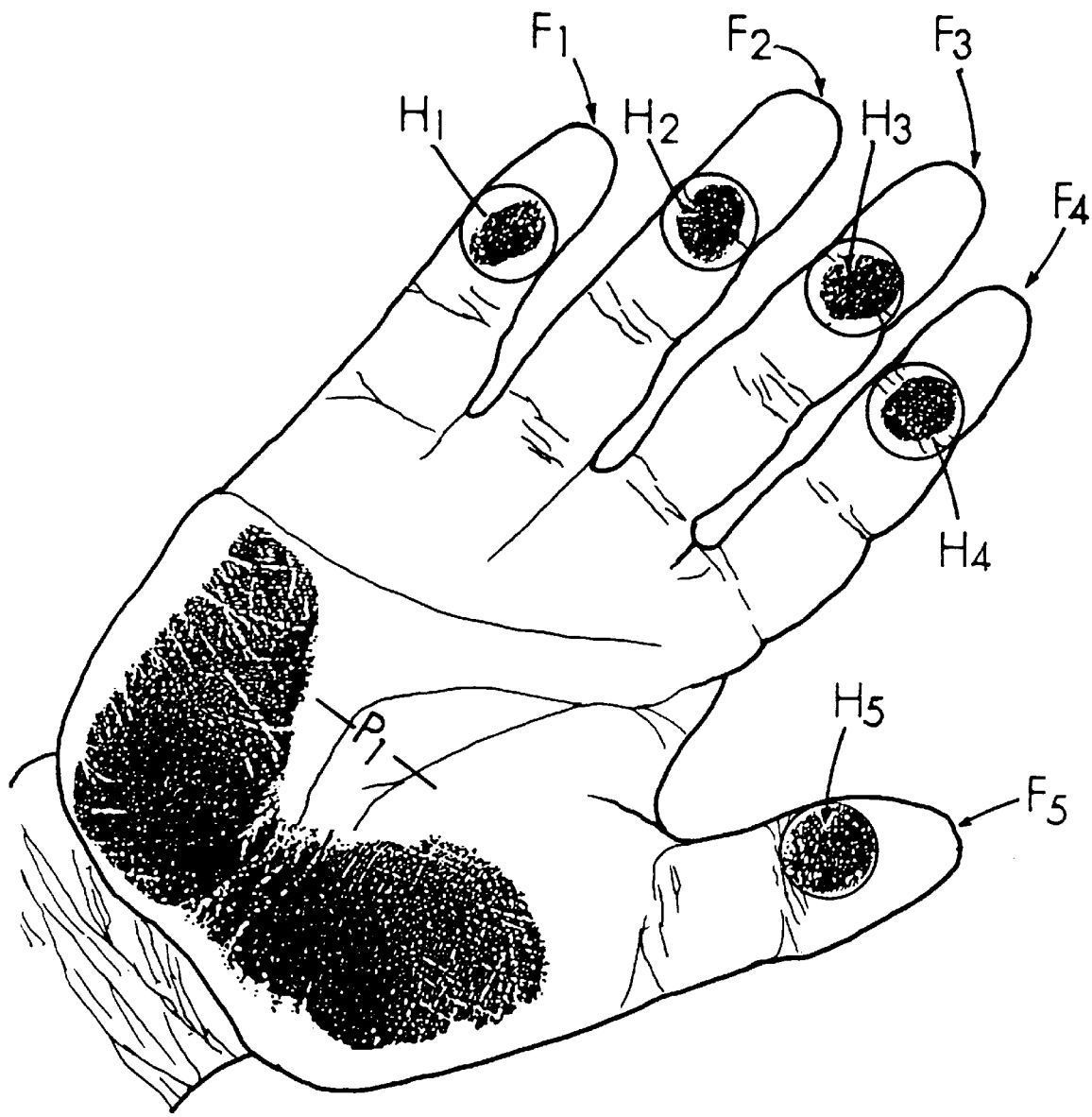
FIG. 6 is a traced left hand in palm-down position showing the home-key location $H_1$–$H_5$ determination based on FIG. 4 and FIG. 5.

Referring next to FIG. 6 which is a plan view of a user's left hand 1 in its relaxed, outstretched position. Fingertip imprints $H_1$ through $H_5$ correspond to fingers $F_1$ through $F_5$ respectively.

The imprints $H_1$ through $H_5$ of the fingertips was made by slightly curving the fingers $F_1$ through $F_5$ while following each finger's natural movement centerline as shown in FIG. 2. This provides the visible imprint touch-point location of palm $P_1$ and five fingertips' imprints $H_1$–$H_5$ when placed on the keyboard. From these fingertip imprints $H_1$ through $H_5$, the ergonomic home key locations are determined. FIG. 6 is a combination of multi-layers of traced hand, palm, and fingertip imprints and traced finger joints on transparencies then superimposed on one another.

Referring next to FIG. 7 showing a plan view of a traced left hand 1, similar to the one in FIG. 6 with more fingertip imprints 15 superimposed on each traced finger to indicate the optimal ergonomic key locations for each finger $F_1$, $F_2$, $F_3$, $F_4$, $F_5$. Fingertip imprints are used to determine how may keys can be accommodated ergonomically in each finger domain.

1. For all five fingers ($F_1$–$F_5$), one key position (or one row if the finger controls more than one column of keys) is available above the home keys identified as $R_1$.
2. For the three fingers $F_2$, $F_3$, and $F_4$, three key positions (or three rows, if the finger controls more than one column of keys) are available below the home keys identified as rows $R_3$, $R_4$, and $R_5$.
3. For pinkie finger, two key positions (i.e. two rows) are available below the pinkie-finger's home key rows identified as $R_4$ and $R_5$.
4. For the thumb, two key positions (i.e. two rows; are available below the thumb's home position $H_5$.

Short horizontal lines SHL were drawn between fingertip imprints to delineate the boundaries of the adjacent fingertip's blocks for the same finger. These blocks are the designated key locations. Since the natural stretch and flex movement of fingers follows each finger's centerline as shown in FIG. 4, the fingertip-imprint within each traced finger's area, as blocks denoted in rows $R_1$–$R_5$, stack vertically into a column.

Referring next to FIG. 8 showing a plan view of left-hand pattern 1 as in FIG. 7 with the fingertip imprints omitted. The corresponding short horizontal lines, SHL as shown in FIG. 7 are connected then smoothed up in an arch to create continuous curved horizontal lines CHL. Based on the straight column lines and curved horizontal lines CHL, the boundaries of each key block is established. This results in the keyboard pattern having distinctive straight columns $C_1$–$C_{10}$ and curved rows $R_1$–$R_8$.

A preferred shape of keys, in this invention, is typically having two straight lateral sides (i.e. a left side and a right side) and two ends (i.e. a front end and a rear end). The two ends of a key are preferably curved. The curved ends of a key located on the left side of its middle finger are usually slightly skew downward to the left; the curved ends of a key located on the right side of its middle finger are usually slightly skew downward to the right. Similarly, the curved ends of keys slightly skew downward to either side of an imaginary vertical center line of a thumb-domain VCL-T; with exception of keys arrayed in circular pattern (FIGS. 23–26).

Referring next to FIG. 9, which shows a location of a palm-key domain 17 on left hand 1. The centerline of domain 17 lines along line P—P. Fingertip imprints and finger joints are superimposed to illustrate the relative position among the finger domains and the palm-key domains.

FIG. 10 shows three palm keys 21, 22, and 23 partitioned from a palm key domain 17 corresponding to the curved palm key domain areas of 18, 19, and 20 respectively as shown in FIG. 9.

FIG. 11 is a side plan view of palm keys sectioned along the dotted curve line P—P as shown in FIG. 10. The top surfaces of the palm keys are curved. The dotted line T—T contours the corresponding underside surface of a user's palm when the palm is in the typing mode.

The palm keys 21–23 are named according to the related finger locations. Therefore palm key 21 is a pinkie-finger palm key $P_p$, palm key 22 is a middle-finger palm key $P_{m-r}$, palm key 23 is an index-finger palm key $P_i$. These keys are programmable keys and can be programmed as toggle-switch-type ON/OFF keys. For example, the pinkie-finger palm key 21 can be assigned as a control key for cursor controller, a key that controls ON/OFF of a cursor controller in the thumb domain.

Figure 12:
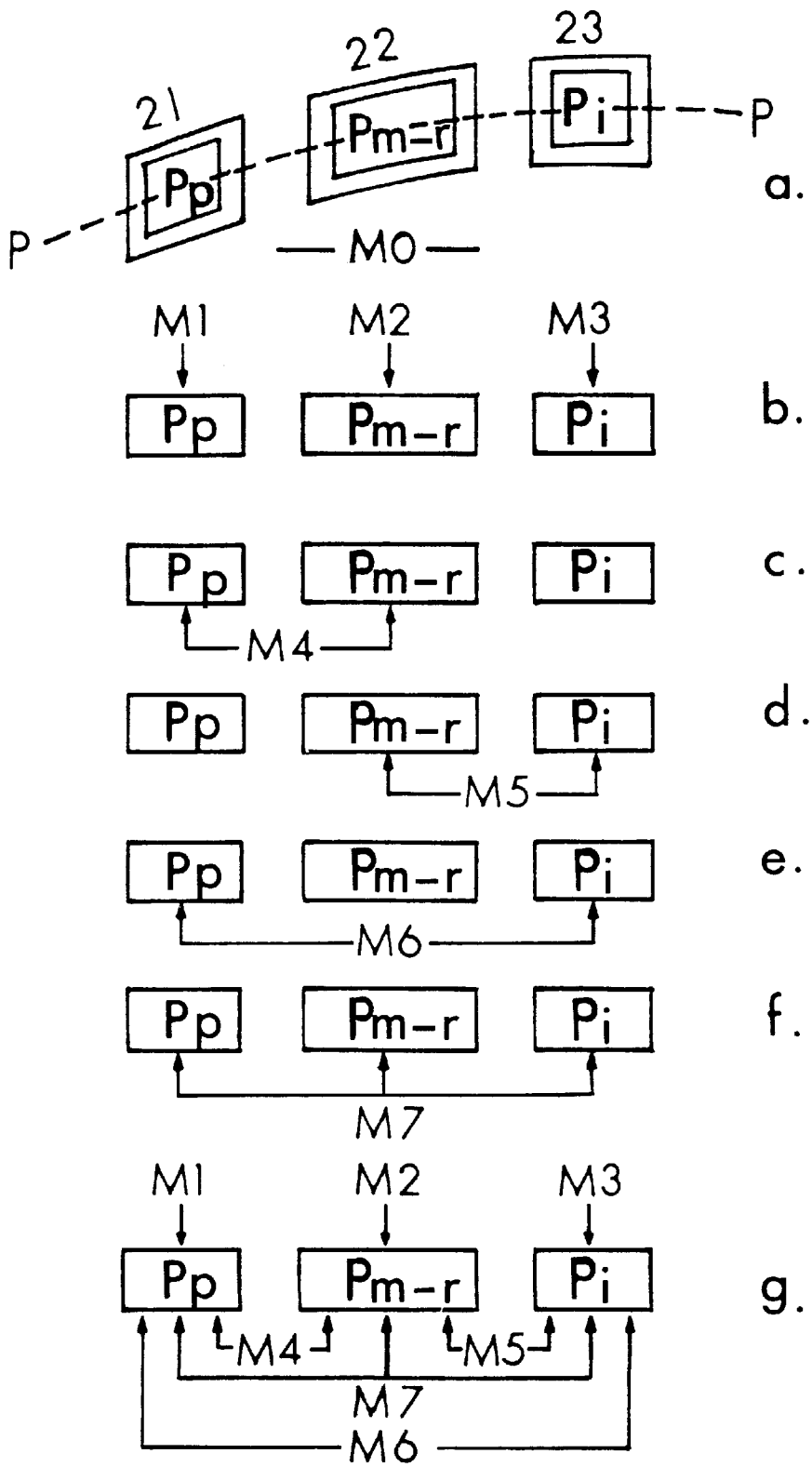
FIG. 12 illustrates eight different functional modes ($M_0$, $M_1$–$M_7$ can be generated by the three palm keys.

Referring next to FIG. 12 showing functions of the palm keys. Arrangement "a" shows a row of palm keys, 21, 22, 23 as shown in FIG. 10. These palm keys are programmable keys. The three palm keys always stay in the original mode, MO, when none of the palm keys are activated as shown in arrangement "a". Each of the three palm keys 21, 22, 23 can be actuated independently to create a function mode, a total of three functional modes M1, M2, and M3 can be generated by the three keys 21, 22, 23 as shown in arrangement "b". Actuation of any two palm keys simultaneously can also generate a function mode. A total of three functional modes M4, M5, and M6 can be generated by the three palm keys 21, 22, 23 as shown in arrangements "c" and "d" and "e". These modes are referred as three two-key co-operative modes. Actuation of all the three palm keys 21, 22, and 23 simultaneously can generate a functional mode M7 referred to as a three-key co-operative mode as shown in arrangement "f". Arrangement "g" combines all of the functional modes in one diagram and shows a maximum of eight functional modes Mo–M7 available from the three palm keys 21, 22, and 23.

Two or more keys programmed to work together to generate a computer function are referred to as co-operative key(s) to each other in a specific mode. Keys in co-operative modes can be programmed as either synchronous co-operative keys or sequential co-operative keys. Synchronous co-operative keys are actuated at the same time or their actuation do not require to follow a specific order. Sequential co-operative keys require being actuated in a specific sequence to get a desired mode.

FIG. 13 is a top perspective view of a left hand 1 resting on joypad 24. The functional design of joypad 24 provides a guide for hand position on the keyboard while enabling a comfortable typing position.

FIG. 14 is a side plan view of FIG. 13 sectioned along line A—A showing relative position of left hand 1 with joypad 24 and palm key 22.

FIG. 15 is a top plan view of joypad 24 with a longitudinal section line A—A and a transverse section line B—B. Joypad 24 has a front center guide mound 27, a rear-end wrist clearance slope 28, a left-side palm contour 29, a right-side palm contour 30, and a joypad position adjustment screw 31.

The front center guide mound 27 prevents a user's hand from moving too far forward. It also massages the center of the user's palm thereby encouraging a relaxed grip on joypad 24. The rear end wrist-clearance slope 28 of joypad 24 slopes downward toward a user's wrist to prevent any significant pressure from being applied to the user's wrist area 32. Wrist area 32 contains a user's carpal tunnel (not shown), an anatomical structure of great ergonomic importance. This tunnel is the pathway for muscles, nerves, and blood vessels from a user's forearm to the hand and fingers. Relieving pressure on the user's wrist helps to prevent Carpal Tunnel Syndrome, an ailment frequently encountered with the use of a standard QWERTY keyboard.

The left-side palm contour 29 and the right-side palm contour 30 of joypad 24 stabilize the position of a user's hand on joypad 24.

FIG. 16 is a side plan view of joypad 24 sectioned along line B—B showing elevated edges of the left side palm contour 29 and right side palm contour 30.

FIG. 17 is a side plan view of joypad 24 sectioned along line A—A showing the front-center guide mound 27 and the rear-end wrist clearance slope 28.

A conventional joystick requires the user to grasp the stick with the entire hand and fingers in order to operate it. This ties up a user's fingers preventing them from performing other more versatile work.

The joypad, by using a palm supporting pad to replace the upper portion of the stick in a joystick, is operated with a user's palm and thus frees a user's fingers to perform other more versatile works, such as typing, actuating the palm keys, operating cursor controller, etc., simultaneously.

FIG. 18 is a top plan view of joypad 24 comprising a joystick (not show) and a circular motion sensor (not shown). The joystick device allows the joypad to move in X-X axis and Y-Y axis. The circular motion sensor allows the joypad to rotate along a circular axis C-C. With the aid of the joystick and circular motion sensor, joypad 24 guides a user's palm and fingers to reach keys ergonomically and accurately.

FIG. 20 shows joypad 24 at its home position. Joypad 24 can be moved forward distance $D_{11}$ to reach one or more rows of keys above the top row of keys, i.e. power reach keys $R_6$ and $R_{10}$, FIG. 19. Or joypad 24 can move backwards distance $D_{12}$ to a position to allow a user to reach keys in lower row $R_4$ and bottom row $R_5$, see FIG. 21.

The term "power reach" is defined as keys that are outside the described finger domains, such as keys in row $R_6$ and the thumb-domain portion of row $R_{10}$; and, thereby, requires the joypad-assisted guide to reach them in an easy, relaxed, efficient, and accurate means.

Circular-motion sensor 33 can be integrated into the joystick base. Basically, a joystick moves along the X and Y axis (i.e., forward, backward, side-to-side) with any two or more combinations (i.e., forward right, then backward left, etc.). A joystick cannot perform circular motions C—C as shown in FIG. 18. Since the wrist can perform circular movement easily (approximately 50°), a circular-motion sensor can be integrated to the joystick base. This would enable the joypad 24 to make more and smoother functions and be a lot easier to control. A circular-motion sensor would enhance computer games making them more vivid, dynamic, and exciting.

Figure 22:
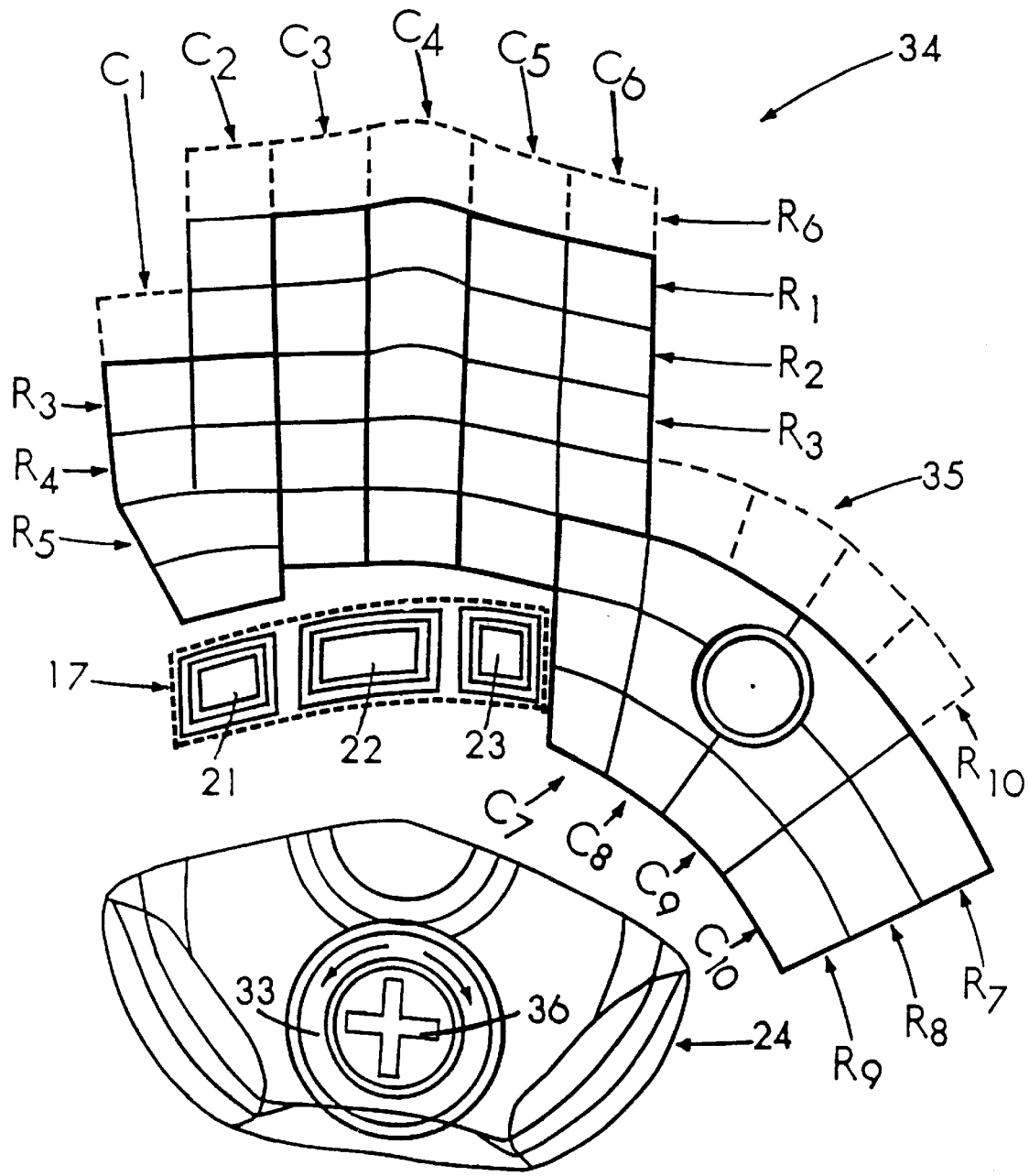
FIG. 22 is a top plan view of a left-quadrant keyboard of the preferred embodiment of the ergonomic designs which incorporate the ideas from FIG. 1 to FIG. 21.

Referring next to FIG. 22 which shows a left-hand quadrant keyboard 34 of the preferred embodiment of the invention. ps 1. Ergonomic keyboard 34 with columns $C_1$–$C_{10}$ and rows $R_1$–$R_{10}$. Its straight columns $C_1$–$C_{10}$ and curved rows $R_1$–$R_{10}$ determined by following the fingers' natural movement. The straight columns $C_1$–$C_{10}$ are finger domains, as shown in FIG. 8. $C_1$ and $C_{10}$ are pinkie-finger domain. $C_3$ is a ring-finger domain. $C_4$ is a middle-finger domain. $C_5$ and $C_6$ are index-finger domains. $R_5$ through $R_7$ of $C_6$ and $C_7$ through $C_{10}$ are thumb domain. The curved rows on the three middle-finger domains are upper row $R_1$, home row $R_2$, middle row $R_3$, lower row $R_4$, bottom row $R_5$ and power-reach row $R_6$.

The curved rows on a pinkie-finger domain are upper row $R_3$, home row $R_4$, lower row $R_5$, button row (Fn key), and power reach row $R_2$. The curved rows on a thumb domain are upper row $R_7$, middle row $R_8$, lower row $R_9$, and power reach row $R_{10}$.

Two adjacent domains may share a common area. Keys fall in a common area of two domains can be assigned to either domain. For example, an overlapped area of index-finger domain (i.e. $R_5C_6$) and thumb domain (i.e. $R_7C_7$) is more accessible to thumb than index finger. Therefore, in most situations, it is preferable to be assigned to the thumb domain.

2. A thumb domain 35 with an integrated cursor controller 16. Keys in the thumb domain 35 are curved. The curved key cluster in the thumb domain 35 is designed by following the natural curvature movement of the thumb and the thumb tip. The cursor controller 16 is located at the thumb tip's home position and surrounded by four adjacent keys. Another option of key arrangement in the thumb domain 35 is a circular array of key cluster surrounding the cursor controller as illustrated in FIG. 23 and its description.

3. A palm key domain 17 with three palm keys 21, 22, 23 capable of providing up to eight functional modes M0 through M7 as shown in FIG. 12 including a control key 21 for cursor controller 16.

4. A joypad 24 is an integration of three different devices—a palm support pad 24, a joystick (not show) and a circular motion sensor (not shown). The position of the palm support pad 24 can be adjusted with a joypad position adjustment screw 36.

Referring next to FIG. 23 a left-quadrant keyboard 34 has a circular-array key cluster on the thumb domain 37. A circular row of eight keys 38–45 surround the cursor controller 16. A user can actuate any circular-array key without lifting the user's thumb tip off the cursor controller 16.

FIG. 24 shows a plan view of the circular-array key cluster 37 surrounding the cursor controller 16. FIG. 25 depicts a detail of three circular array keys 39, 40, 41. The inner side of a circular-array key 40 has a pointed end PE with wider key gap WG to avoid accidentally actuating the adjacent keys.

FIG. 26 shows a side view plan of the circular-array key cluster sectioned through the dotted line (FIG. 24) W—W showing [the] a cursor controller 16 and two of the circular-array keys 38 and 42. A user can roll the trackball, arrows with dot lines, or glide the thumb tip on the touch pad, to touch the key without the need to lift the thumb from the cursor controller to depress a circular-array key 38 or 42.

Figure 27:
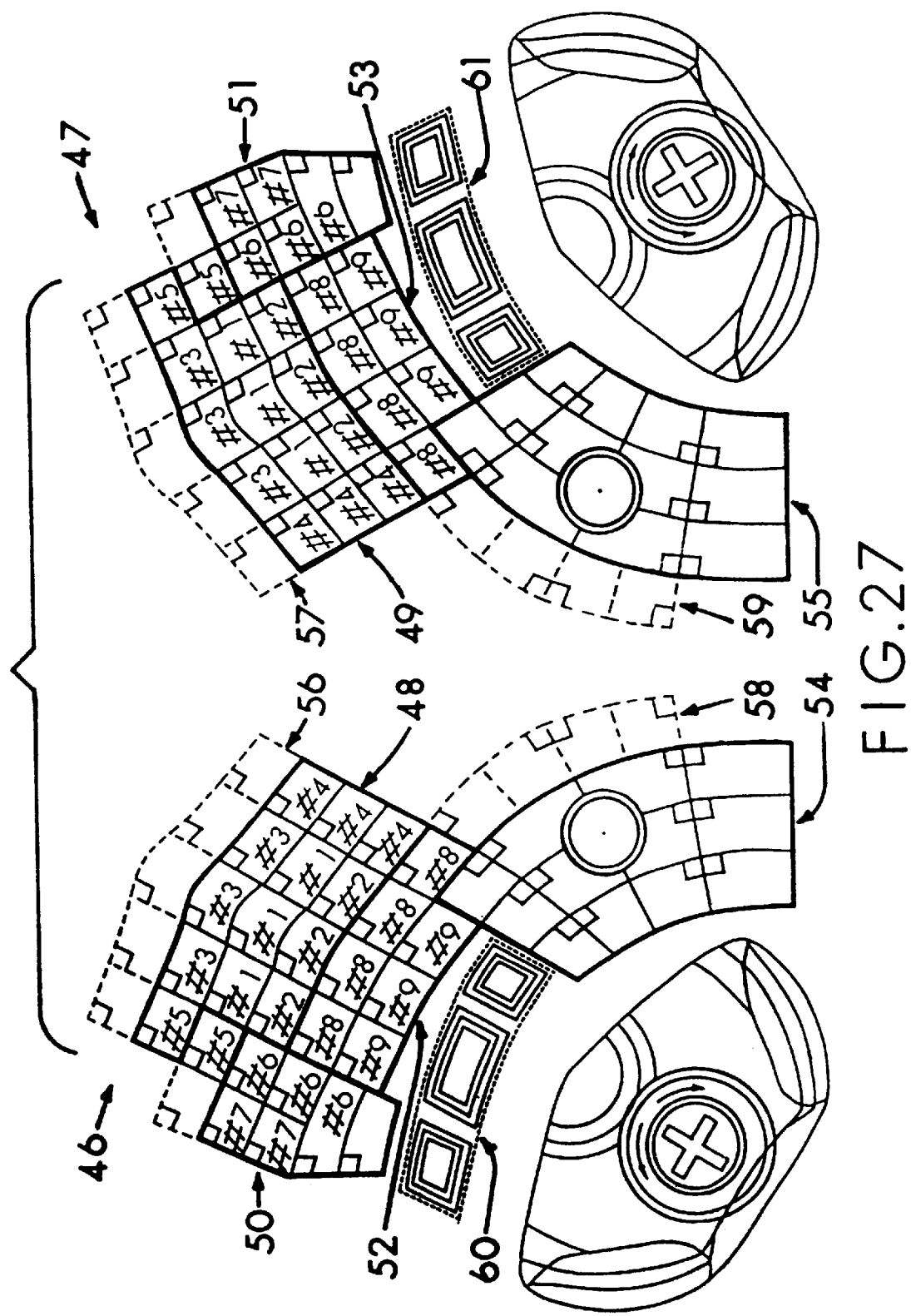
FIG. 27 is a top plan view of a pair of keyboards and four black-outlined group blocks (the high-frequency block, the lower block, the pinkie-domain block and the thumb domain block) on each quadrant keyboard partition based on the set of priority order rating rules.

Referring next to FIG. 27 a priority order of key assignment is shown. Keys in the keyboard are graded according to typing efficiency and the accessibility to the fingers. The most efficient and accessible keys are graded as group #1; the next efficient and accessible keys are graded as group #2 and so on. The priority order of keys serves as the main parameter in the character assignment in the keyboard. Keys in high-frequency blocks 48, 49 are assigned to most commonly used characters, as a group, in a program or language. Usually alphabets and/or phonetic symbols are considered as high-frequency characters and are assigned to these blocks. Ideally, each user should be a decision maker on which group of characters are assigned to the high-frequency blocks.

The number of high-frequency characters needed on a user-friendly keyboard will vary with a user's language. For example, in the English language, there are 26 alphabet characters; in Chinese Mandarin phonetics, there are 37 symbols with sound marks of 4 tones. Since the number of high-frequency characters in different programs or languages are different, it affects the size and geometry of the high-frequency blocks. This establishes a set of rules of priority order for keys in the high-frequency block.

The priority order rating generally follows the pattern of accessibility and keyboard geometry. A pair of keyboards, 46 and 47, are shown. Based on the priority rules, two blocks of keys surrounding the home keys are marked as high-frequency blocks 48, 49. Home keys, are considered as highest priority keys. Keys in the middle row, are considered as next priority keys. Keys on the upper row, are the third priority, and so on. Numbers shown on the key represent the preferred priority order of keys in a user-friendly keyboard. Standard QWERTY keyboards require the users to flex their fingers extensively to line up on the home rows; therefore, the upper row is considered as its second priority row. In the user-friendly keyboard, fingers are only slightly flexed (to create a curved home row that is comfortable and ergonomic to the users). Therefore, the adjacent row below the home row (i.e. middle row) is considered as its second priority row.

The priority order establishes a method for which keys are put in use in the keyboard.

As described above, a concept of "group-block" strategy is coined. Characters of similar function are "grouped" together. Each group is assigned to a reserved "block" for that group of information bits on the keyboard. In the assigned block, the information bits are arranged in organized manner. The group-block strategy takes care of the needs of both typing efficiency and user friendliness of the keyboard design. For typing efficiency, the most frequently used characters are placed in the block of keys most accessible to the fingers. For user friendliness, characters in the blocks are assigned in an organized manner.

A preferred group-block assignment in the user-friendly keyboard is described as follows:

alphabetic group is assigned to the high-frequency blocks 48, 49.

numeric group is assigned to the pinkie-finger domain blocks 50, 51;

punctuation group is assigned to the left quadrant keyboard 46 below the high-frequency block—the left lower block, or simply named as the punctuation block 52;

symbolic group is assigned to the right quadrant keyboard 47 below the high-frequency block—the right lower block, or simply named as the symbolic block 53;

commonly used words and data processing information bits are assigned to the thumb domain blocks 54, 55;

certain basic computer functions are assigned to the power-reach rows in blocks 56, 57, 58, 59;

toggle-switch-type ON/OFF programmable keys are assigned to the palm-key domain blocks 60, 61.

Figure 28:
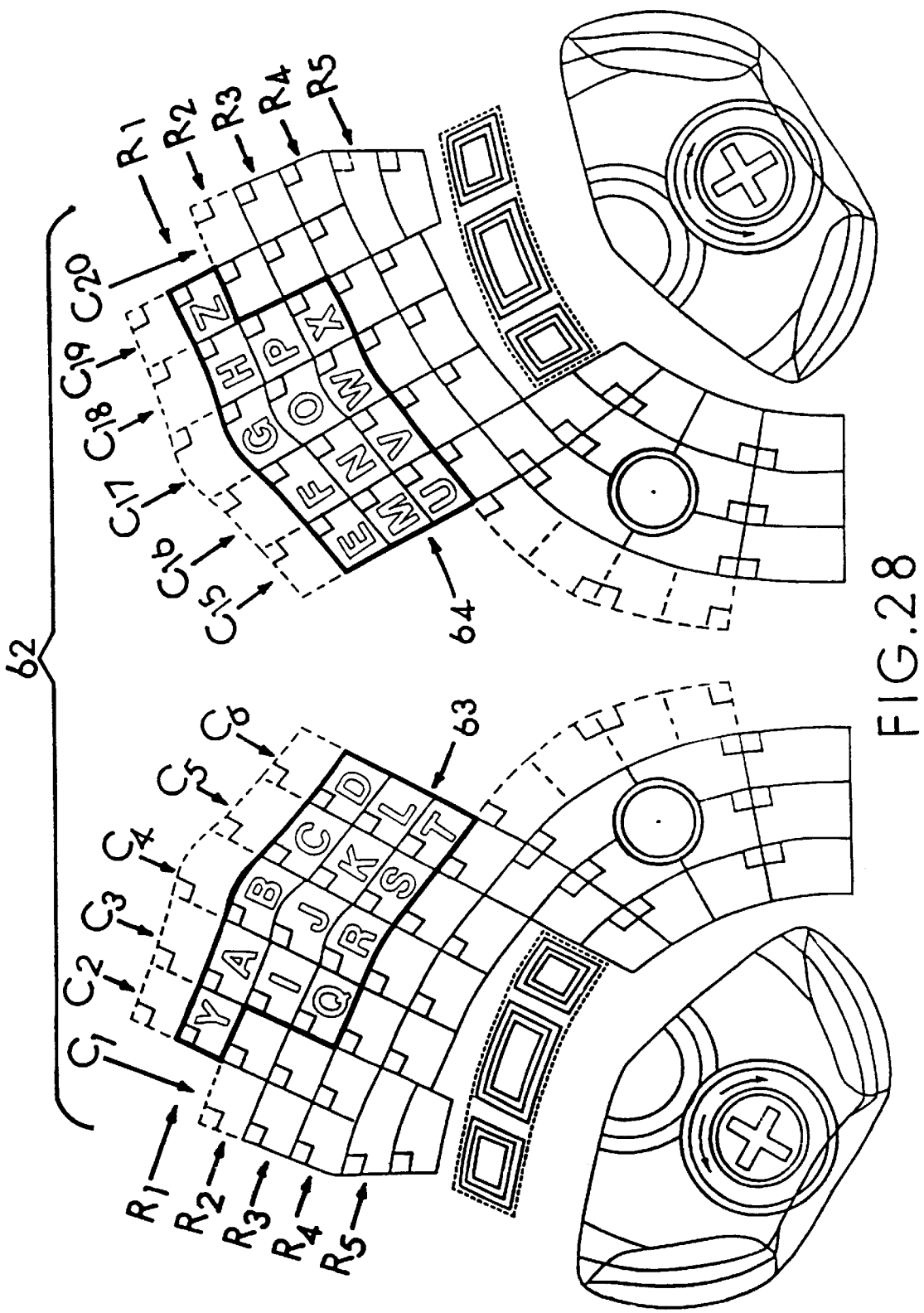
FIG. 28 is a top plan view of a pair of keyboards and a horizontal English alphabet arrangement in the two high-frequency blocks.

Referring next to FIG. 28 showing a pair of key boards 62 with high-frequency blocks 63, 64. Alphabetic arrangement in these two blocks follow the continuous horizontal arrangement across the keyboard.

Alphabet characters are considered to be most commonly used information bits; therefore, the alphabet character arrangement in the keyboard is an important issue. There are numerous different patterns of alphabet character arrangements in sequenced orders. The group-block strategy shown in FIG. 27, which assigns the most frequently used character group to the high-efficiency blocks 63, 64 in an organized manner, takes care of both typing efficiency and user-friendliness.

FIG. 28 illustrates a continuous horizontal arrangement of alphabets across the keyboard 62. Alphabet characters are assigned horizontally in sequence starting with letter "A" at $R_1C_3$ to letter "D" at $R_1C_6$ on the left-quadrant high-frequency block 63, then across the keyboard 62 and continued on the right-quadrant high-frequency block 64 starting with the letter "E" at $R_1C_{15}$ to the letter "H" at $R_1C_{18}$, and so on.

Figure 29:
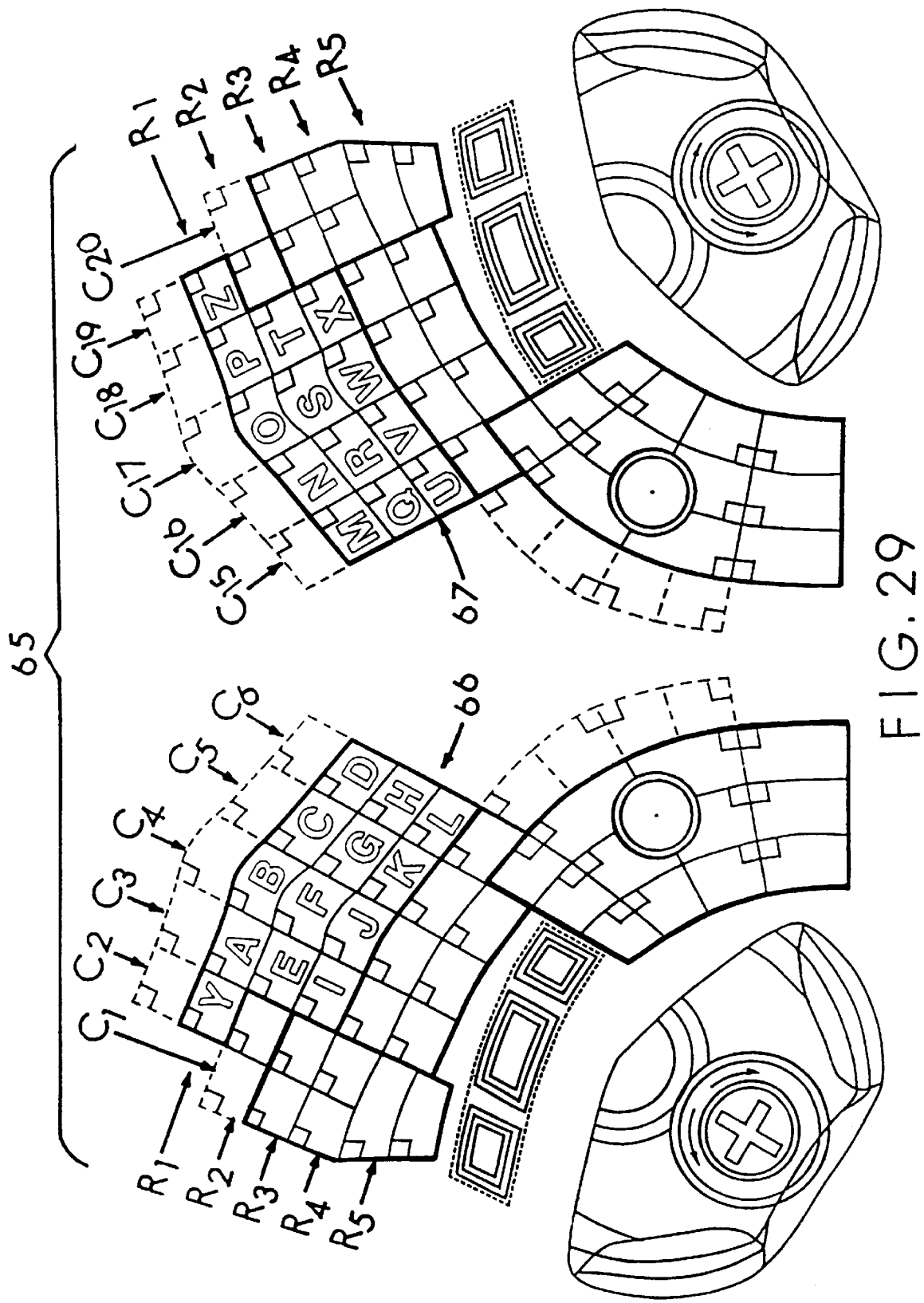
FIG. 29 is a top plan view of a pair of keyboards and a preferred embodiment of horizontal English alphabet arrangement in, a split into two halves format, the two high-frequency blocks.

Referring next to FIG. 29 a pair of keyboards 65 showing horizontal split alphabet character arrangement of the keys in the two high-frequency blocks 66 and 67. This character arrangement splits the alphabet character arrangement in half with "A"–"L" and "Y" keys on the left quadrant and "M"–"X" and "Z" on the right quadrant.

The letters "A"–"L" and "Y" are assigned to the left-quadrant high-frequency block 66. Starting with letter "A" at position $R_1C_3$ following the horizontal row and assigning letters to the keys within the block 66 in alphabetic order. The sequence on keyboard 66 stops on letter "L" at position $R_3C_6$.

Similarly, the right-quadrant high-Frequency block 67 begins with the letter "M" at the position $R_1C_{15}$ follows the rows and assigns the second half of the alphabet to the keys in alphabetic order. Letter "Y" is assigned to a key $R_1C_2$) on the left quadrant extended ring-finger domain; letter "Z" is assigned to a key ($R_1C_{19}$) on the right quadrant extended ring-finger domain.

Figure 30:
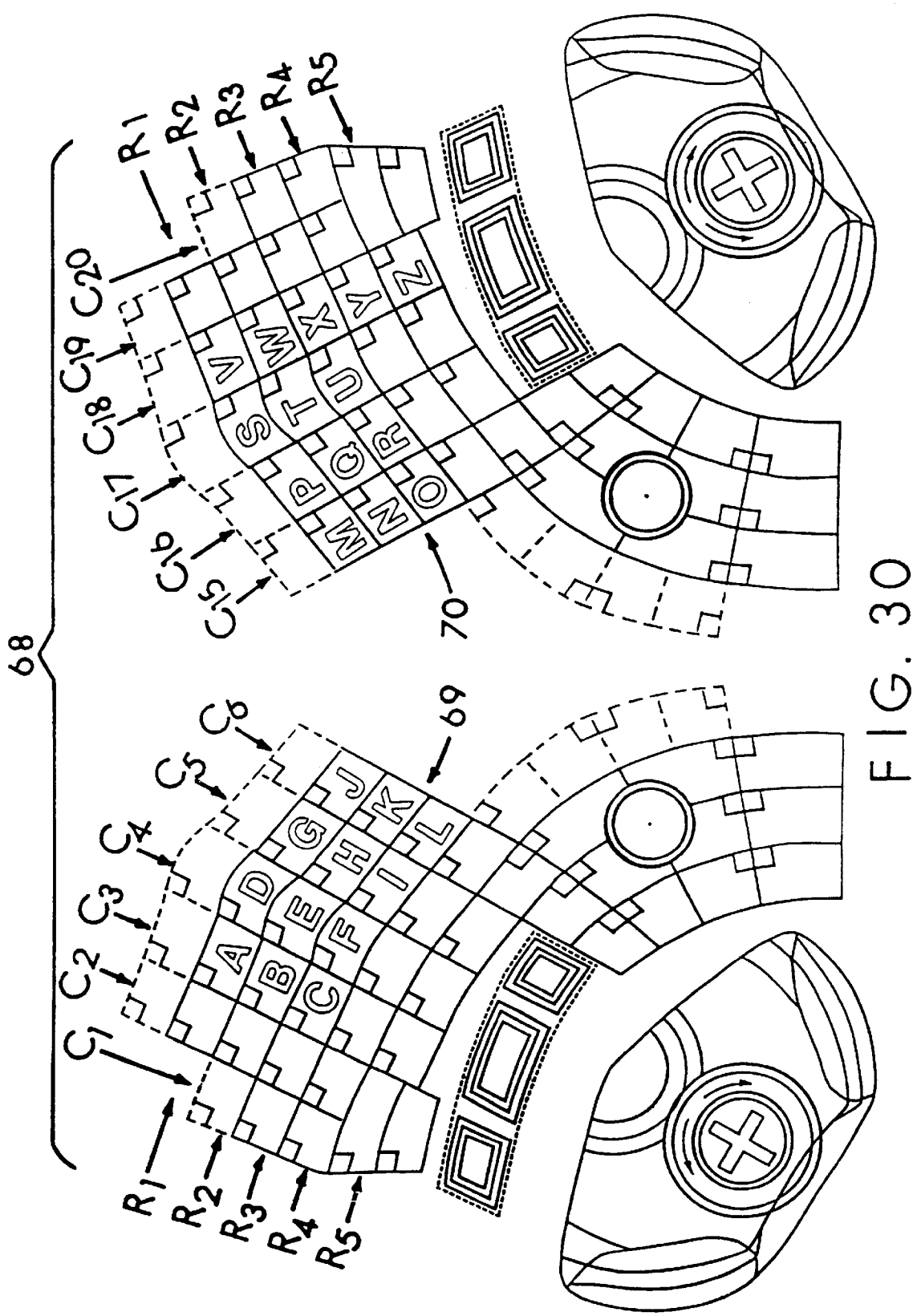
FIG. 30 is a top plan view of a pair of keyboards and a vertical English format in two high-frequency blocks.

Referring next to FIG. 30 a pair of keyboards 68 has a left-quadrant high-frequency block 69 and a right-quadrant high-frequency block 70. A vertical English alphabetic character arrangement starts at position $R_1C_3$ with the letter "A" down the column to "C" at position $R_3C_3$ [then to each subsequent key down the column to $R_3C_3$ with the letter "C"] and serially descending in columns $C_4$, $C_5$, $C_6$, $C_{15}$, $C_{16}$, $C_{17}$ respectively.

This style of vertical arrangement of characters places the vowels A, E, I in line diagonally on the left-side keyboard and the vowels O and U are in line on the same horizontal row of the right-side keyboard with letter R in between.

Figure 31:
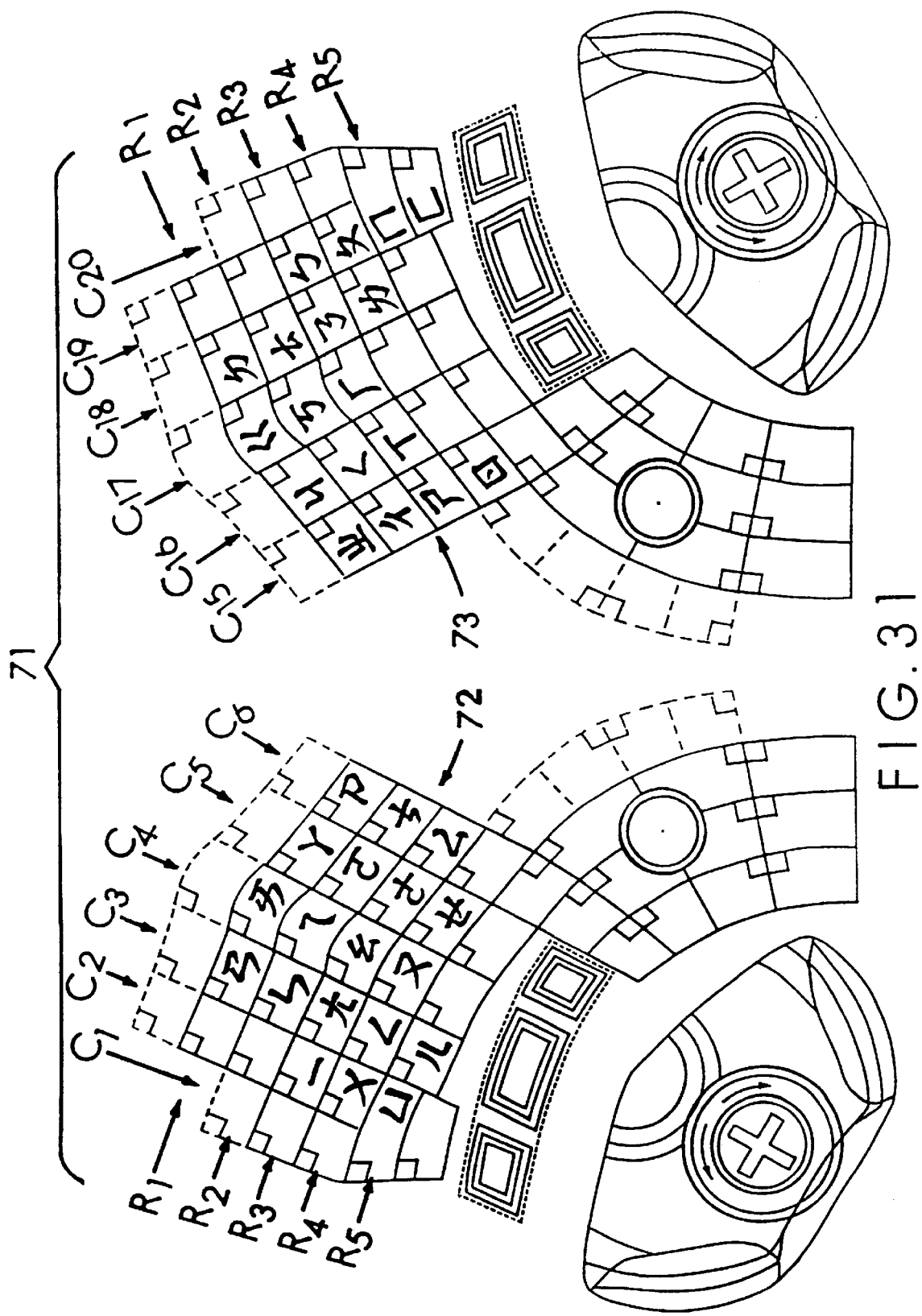
FIG. 31 is a top plan view of a pair of keyboards with vertically arranged Mandarin phonetic symbols in swo modified and enlarged high-frequency blocks.

Referring next to FIG. 31 a pair of keyboards 71 has left quadrant 72 and right quadrant 73. The first half of the Mandarin phonetic symbols is laid out vertically in the right quadrant 73. The second half of the Mandarin phonetic symbols is laid out vertically in the left quadrant 72.

Chinese characters and its phonetic symbols are typically written vertically from right to left. This is an example of character arrangement vertically for certain languages that are written in vertical order.

The Mandarin phonetics has more symbols (37 symbols) than the English alphabets (26 letters), it is also grouped into segments varying in the number of symbols; therefore, the area of the high-frequency block is bigger than the English and its outline is irregular.

Figure 32:
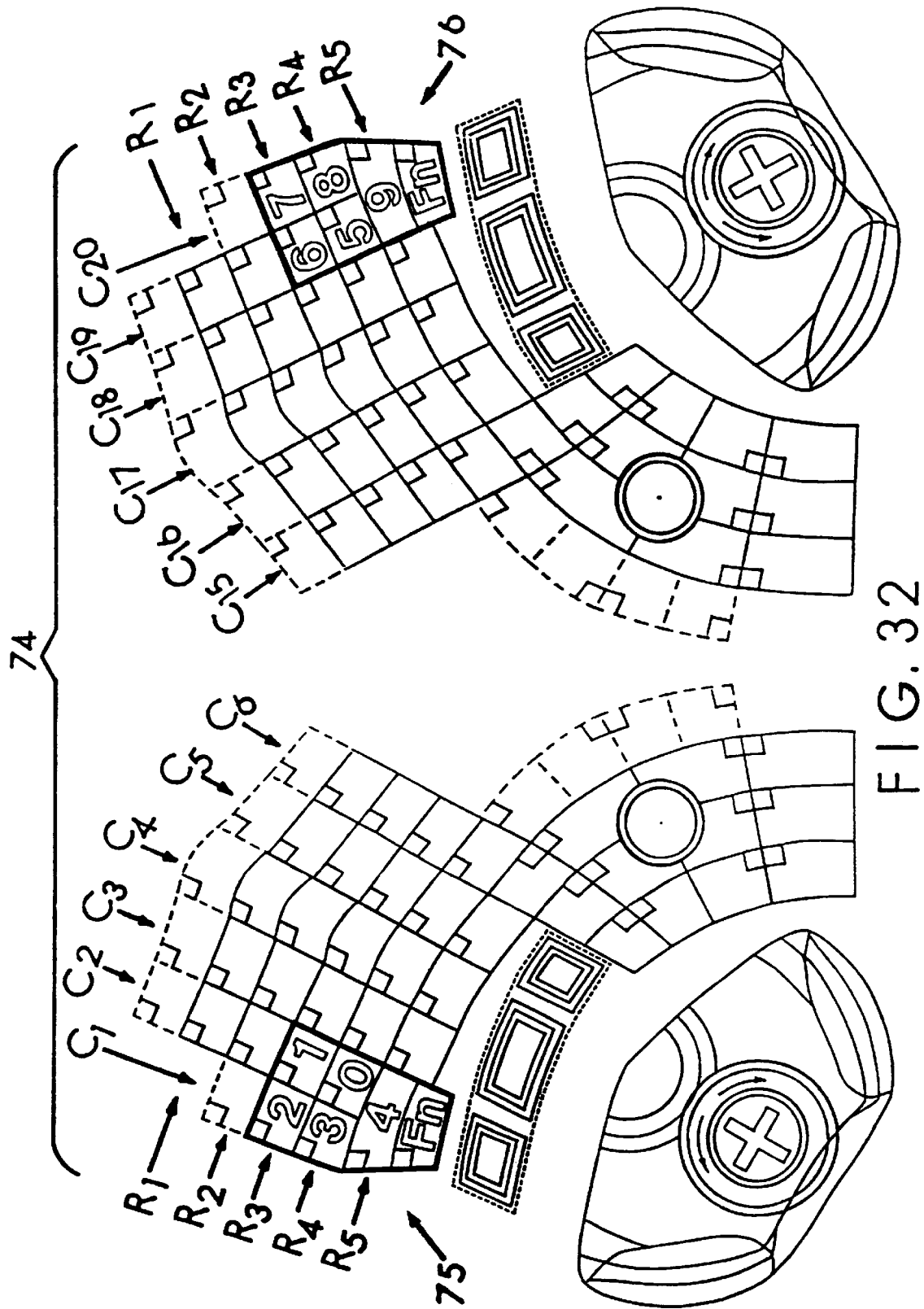
FIG. 32 is a top plan view of a pair of keyboards and a preferred numeric arrangement in two pinkie-finger domains.

Referring to FIG. 32 showing a pair of keyboards 74 with two pinkie-finger domains 75, 76. The irregular pentagon shape of the pinkie-finger domains 75, 76 are created based on ergonomic studies related to the pinkie fingers as shown in FIGS. 2–8. Each pinkie-finger domain is partitioned into six blocks (i.e. six keys) forming two columns, (i.e. $C_1$ and $C_2$ on the left quadrant and $C_{19}$ and $C_{20}$ on the right quadrant) and four rows, i.e. $R_3$–$R_5$ and a $f_n$ key on each quadrant. In the present invention, keys in the two pinkie-finger domains 75, 76 are assigned to the numbers (0–9) and two function key $f_n$, one on each pinkie domain.

The pinkie-fingers are weak in the key stroke. It is shorter than the three middle fingers. On considering the key stroke ergonomics and typing efficiency, these two domains should be assigned to those characters of less frequent use.

Generally speaking, number characters are less frequently used. 0, 1, 2, 3, 4 are on the left-hand side 75. Assignments start at "0" from the left pinkie-finger home key $R_4C_2$ in counter-clockwise order. 5, 6, 7, 8, 9 are on the right-hand side 76. Assignments start at "5" from the right pinkie-finger home key $R_4C_{19}$ in clockwise order. At the bottom of each pinkie-finger domain is a key reserved to be computer function key $f_n$. By pressing down and holding the function key $f_n$ with the pinkie finger while typing in the desired numbers with the ring finger, a numbered function code can be actuated (i.e. fn1, fn2, fn3, etc.). If both the number keys and the function (Fn) key to be actuated are on the same hand side, a user can hold down the function (Fn) key with the pinkie finger while typing the desired number with ring finger. Similarly, by pressing and holding the function key $F_n$ with a pinkie-finger and typing in letters with the other fingers, certain user-friendly lettered function codes can be actuated (i.e. fn help, fn search, fn delete, etc.).

Keying in a lettered function code (e.g. $f_n$ help) may not be as efficient as keying in a numbered function code (e.g. $F_n 1$). However, the former method is more user friendly in communication between computer and user. A user can operate a computer in a more "human-thinking logics" without the prerequisite of memorizing those function codes, commands, or other computer logics.

Traditionally, numerical keys are arranged in order above the alphabetic keys, or to the right side in a ten-key pattern. When placed at the top of the keyboard, it is a far reach to the key from the home position. At times, it is necessary to lift the entire hand to reach the number key desired. In addition, a conventional computer keyboard currently used also has a row of function keys (e.g. F1–F12 etc.) at the top of the keyboard. Many of these keys are duplicated in their functions; they take more keyboard spaces and perform limited functions. Two sets of number keys is an example; the numbered function key that occupies at least twelve key spaces is another example.

In this invention, the pinkie-finger domains take less keyboard spaces and are capable of being programmed to produce unlimited function codes.

Figure 33:
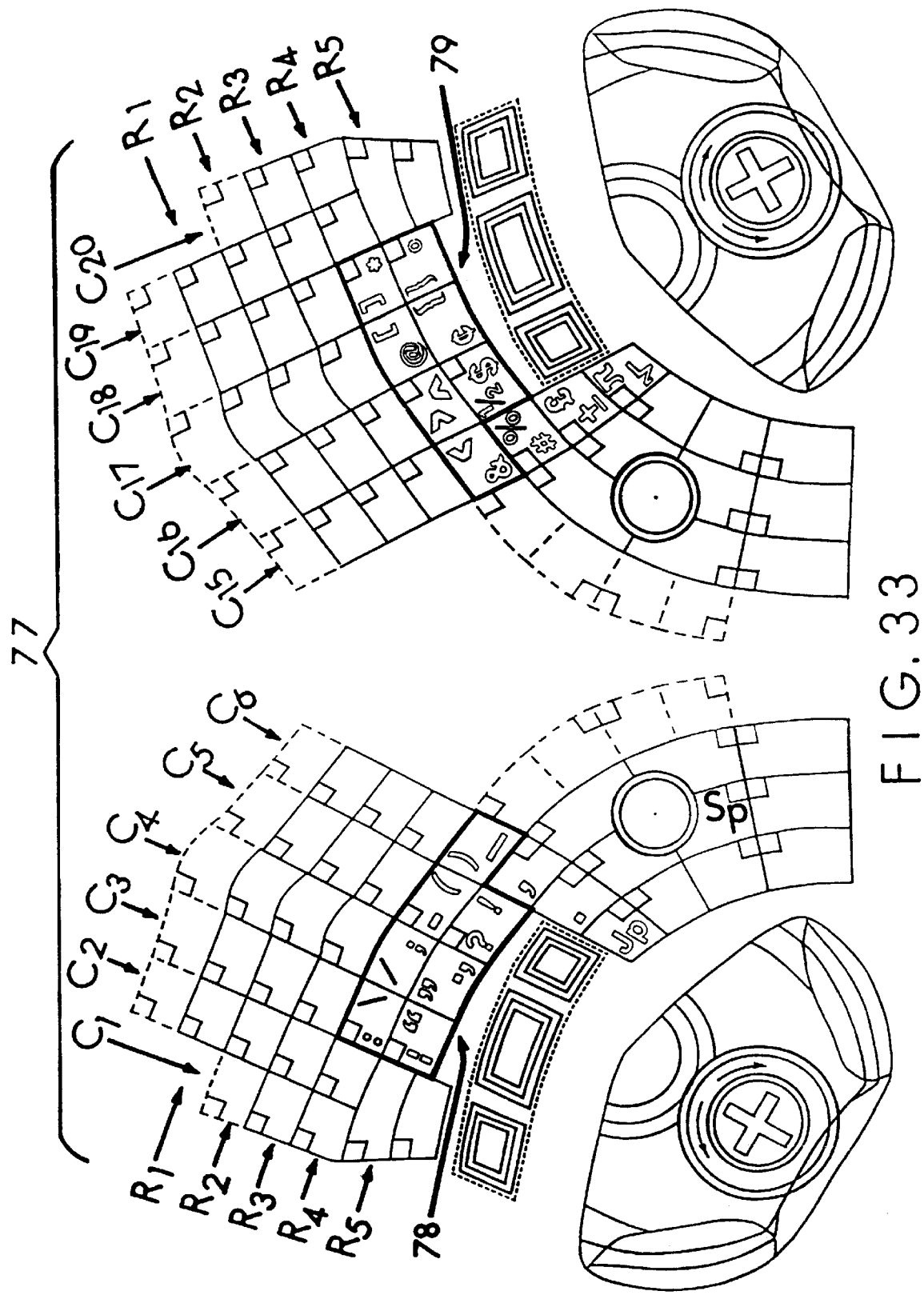
FIG. 33 is a top plan view of a pair of keyboards and preferred punctuation (on the left-side) and symbolic (on the right-side) arrangements in two lower blocks.

Referring next to FIG. 33 showing a pair of keyboards 77 with two lower blocks 78, 79. The left-hand lower block 78 is assigned to a punctuation group. The right-hand lower block 79 is assigned to a symbolic group. Characters in these two groups do not have an established order; therefore, the character arrangement basically follows the guidelines of being user friendly and typing efficiently.

In considering the ease of keyboard memory, characters having the following properties are either assigned to the same key or are adjacent to each other:

a) pairs: such as (and), { and }, [ and ], <and >, etc.

b) geometrical symmetries: such as \ and / 'and ', : and ; , —and _, etc.

c) functionally related: such as $ and ¢ ? and !, # and %, etc.

In considering the typing efficiency, those more frequently used characters are assigned to the lower case of the more easily accessible keys. Usually, keys in a lower row are considered more easily accessible to fingers than keys in a bottom row.

The space key $R_8C_9$ is assigned to one of the most accessible keys adjacent to the thumb's home position, the cursor controller. The most commonly used two punctuation, the comma (,) $R_7C_7$ and the period (.) $R_8C_7$ are assigned to the two easily accessible keys in the left-hand side thumb domain close proximity to the left-hand lower block.

Figure 34:
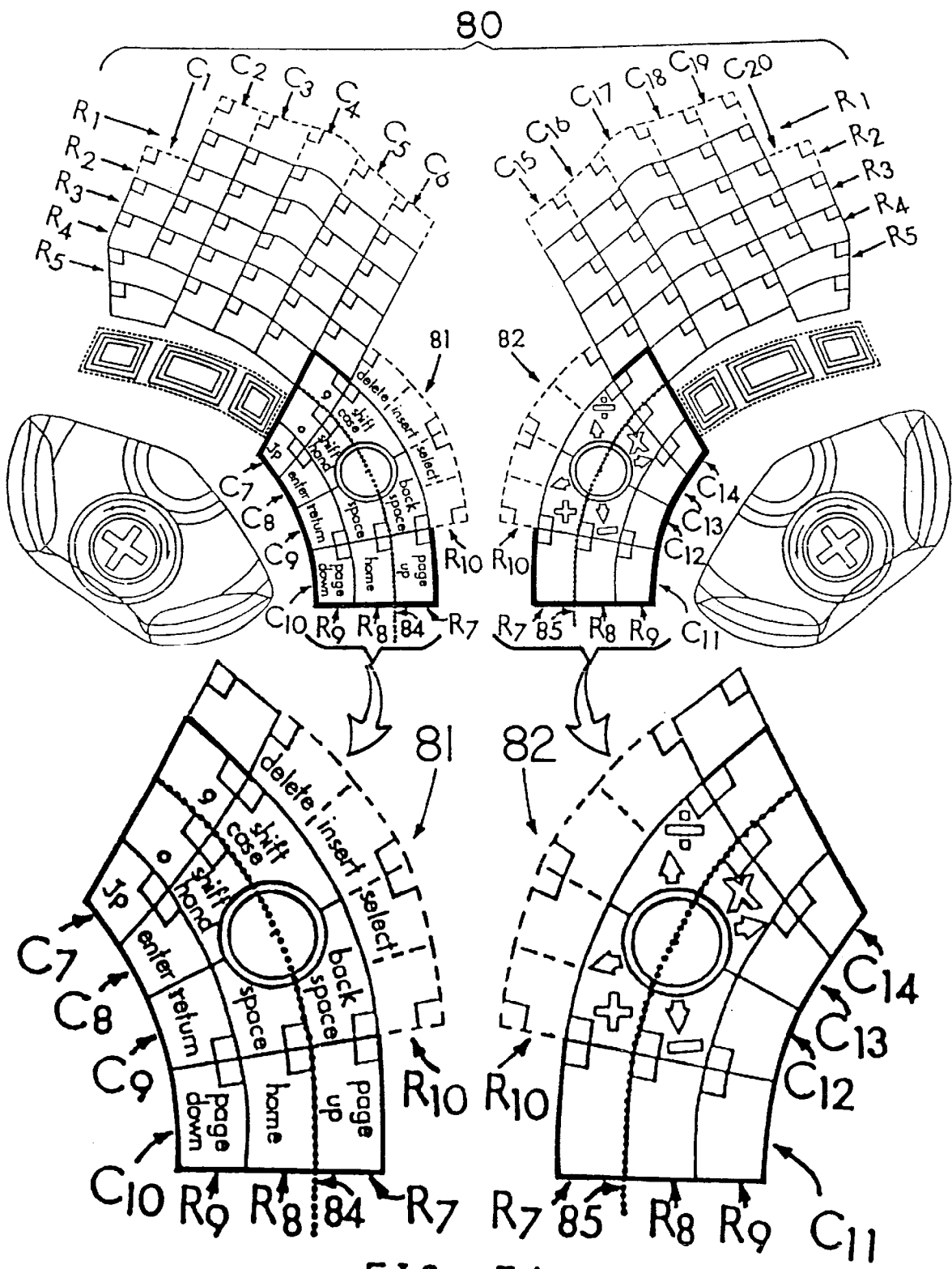
FIG. 34 is a top plan view of a pair of keyboards and preferred character arrangements in two thumb domains.

Referring next to FIG. 34 showing a pair of keyboards 80 with two thumb domains 81, 82. The two thumb domains are mirror images in appearance; left-hand thumb domain is used to explain the designing work in a thumb domain:

1) A cursor controller 16 in the thumb-home position is surrounded by four adjacent curved thumb keys. The cursor controller 16 is the functional center of the thumb-domain 81 and is surrounded by curved keys; shift case, $R_7C_8$; back space, $R_7C_9$; space, $R_8C_9$; and shift hand, $R_8C_8$.

2) A curved thumb's home line 84 follows the thumb's curved movement and across the center of the cursor controller 16. This line 84 delineates a curved upper row $R_7$ and a curved middle row $R_8$ of keys in the thumb domain 81. A curved lower row $R_9$ of keys is below the curved middle row $R_8$ in the thumb domain 81.

3) Four of the frequently used word processing characters (i.e. shift-case key $R_7C_8$, back space key $R_7C_9$, space key $R_8C_9$, and shift-hand key $R_8C_8$) are assigned to the thumb keys adjacent to the cursor controller.

4) The space key $R_8C_9$ is positioned on the middle row $R_8$ and is outward next to the cursor controller 16 and it is also curved to follow the natural movement of a user's thumb.

5) The shift-hand key $R_8C_8$ (i.e., shift between first-hand panel and second-hand panel if user wishes to be a single-handed typist) is positioned on the inward side of the middle row $R_8$ next to the cursor controller 16. When using the single-hand keyboard, this key allows a switch of assigned letters from A through L to the M through X letters as described in FIGS. 38, 39.

6) The shift-case key $R_7C_8$ is positioned above the shift-hand key $R_8C_9$. These two keys $R_7C_8$ and $R_8C_8$ can be actuated simultaneously by a single key stroke of a user's thumb to get upper-case characters of the second hand panel. (Also see FIGS. 38–39).

The character assignment on the left-thumb domain is shown for the shift-case key, $R_7C_8$; shift-hand key, $R_8C_8$; space key, $R_8C_9$; back space key, $R_7C_9$; comma (,) key, $R_7C_7$; period (.) key, $R_8C_7$; jump key, $R_9C_7$; enter key, $R_9C_8$; return key, $R_9C_9$; page-up key, $R_7C_{10}$; home key $R_8C_{10}$; and page-down key, $R_9C_{10}$.

The comma (,) key, $R_7C_7$, is located in an overlapping area of index-finger domain and thumb domain. Since the key is more accessible by the thumb than the index-finger, this key is assigned to the thumb domain. The jump key $J_p$, $R_9C_7$ is a programmable key reserved mainly for computer games and graphics in the 3-D expression.

Two keys that actuate simultaneously by a single finger are referred to an single-finger co-operative keys. They are placed next to each other, such as: press shift-hand key $R_8C_8$ and shift-case key $R_7C_8$ together with left thumb actuate the upper case character mode of the second-hand panel. Pressing the home key $R_8C_{10}$ and page-up key $R_7C_{10}$ together with the left thumb moves the cursorial indicator to the beginning of a program or document. Similarly, pressing home key $R_8C_{10}$ and page-down key $R_9C_{10}$ together moves the cursorial indicator to the end of a program or document.

The thumb domain keys located in the power reach row $R_{10}$ are reserved for certain computer functions, such as delete, insert, select. Select key is not a highlighting key. To highlight or de-highlight a piece of data, the palm keys 21 and 22 should be actuated first (refer to FIG. 12 arrangement C) before manipulating the cursor controller. Therefore, this can be considered as a three-key co-operative mode (21, 22, 16).

The character assignments on the right-hand-thumb domain keys surrounding the cursor controller 83 as shown. The lower case of these four keys are arrow keys: $R_7C_{12}$ is a leftward-pointed arrow key; $R_7C_{13}$ is a upward-pointed arrow key; $R_8C_{13}$ is a rightward-pointed arrow key; $R_8C_{12}$ is a downward-pointed arrow key. The upper case of these four keys are mathematics keys: $R_7C_{12}$ is a plus (+) key; $R_8C_{12}$ is a minus (−) key; $R_8C_{13}$ is a multiple (×) key; $R_7C_{13}$ is a divide (÷) key. Keys not assigned here can be assigned for other purposes.

Figure 35:
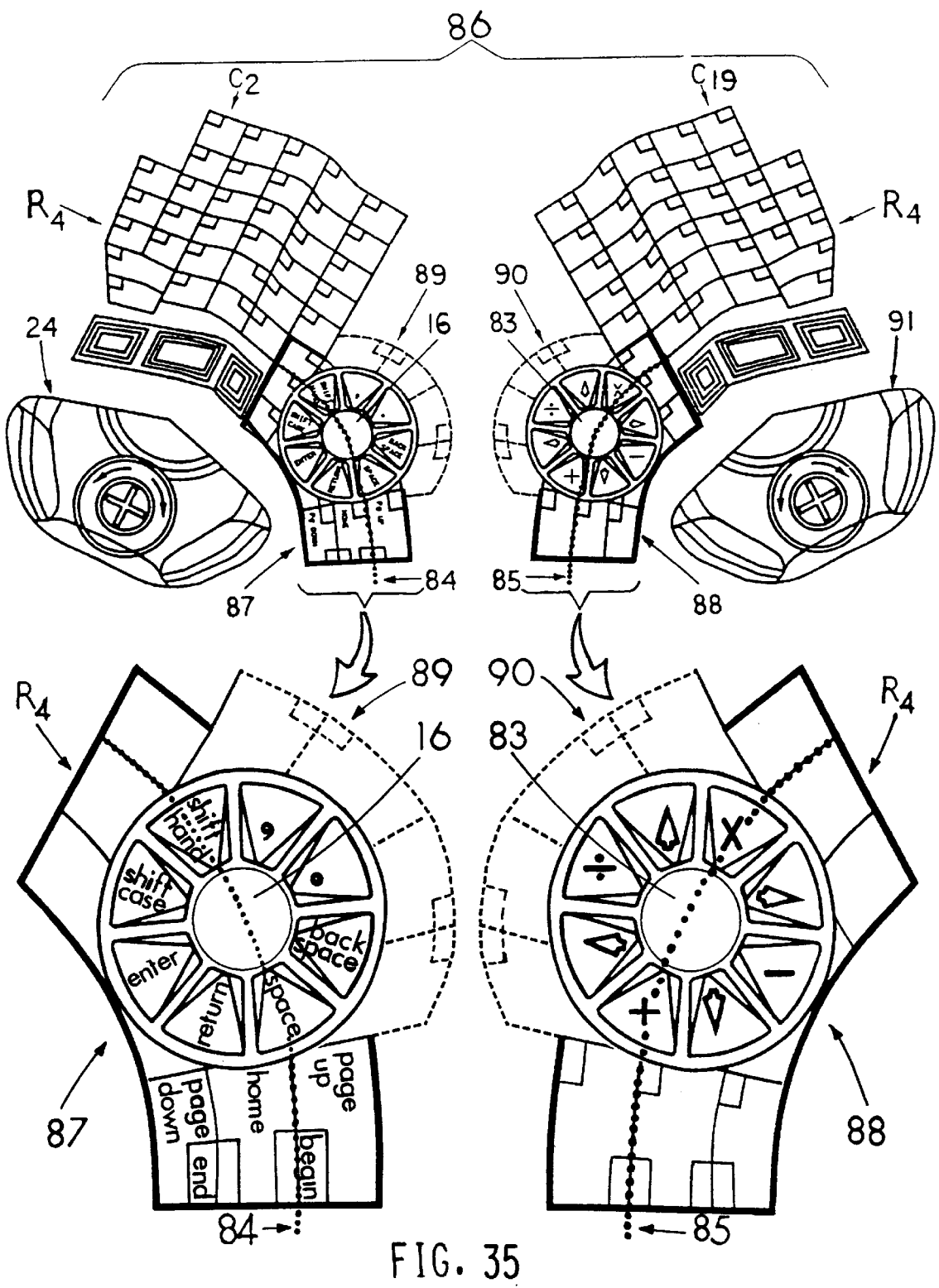
FIG. 35 is a top plan view of a pair of keyboards and preferred character arrangements on the circular-array key cluster in two thumb domains.

Referring next to FIG. 35 showing a pair of keyboards 86 having two circular-array key clusters 89 and 90 in the thumb domains 87 and 88. The circular-array key clusters 89 and 90 are thumb keys arranged around the cursor controllers 16 and 83 in circular array. The thumbs are anchored on the cursor controllers 16 and 83 wherein touching any key around the cursor controllers 16 and 83 will actuate it. A user does not have to lift up his/her thumbs and press the key(s). This improved design of keys in the thumb domains 87 and 88 is user friendly, efficient and ergonomic. With the palms resting on the joypads and the pinkie fingers resting on their home keys $R_4C_2$ and $R_4C_{19}$ and the thumbs resting on the cursor controllers 16 and 83, keystrokes are smoother and accurate and hand, wrist, and arm fatigue is reduced.

Character arrangement on the left-hand side circular-array key cluster 89 starting from a key on the inward side of the curved thumb home line 84 in clockwise order are: shift-hand key; comma (,) key; period (.) key; back space key; space key; return key; enter key; and shift-case key. Two frequently used keys, the shift-hand key and the space key, are on the curved thumb home line, (i.e. home row).

The shift-hand key and the shift-case key are co-operative keys. By actuating the shift-hand key and shift-case key simultaneously with the user's thumb, the keyboard format switches to the upper-case character mode of the second-hand panel.

Character arrangement on the right-hand side circular-array key cluster 90 starting on the curved thumb home line 85 in counter-clockwise order are: multiply (×) key; upward-pointed arrow (↑) key; divide (÷) key; leftward-pointed arrow (e) key; plus (+) key; downward-pointed arrow (↓) key; minus (−) key; and rightward-pointed arrow (→) key. The two frequently used mathematical keys, the multiply (×) key and the plus (+) key, are on the curved thumb home line.

Figure 37:
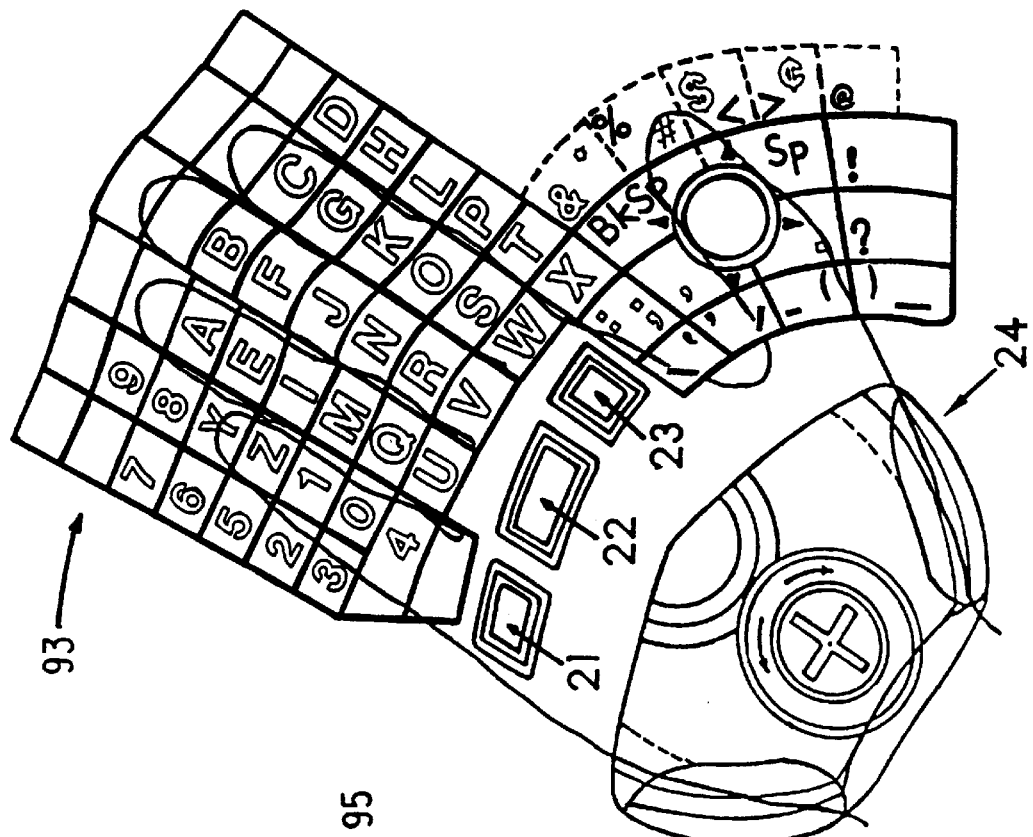
FIGS. 36, 37 are top plan views of two styles of single-hand keyboards having more than 50 key positions on each style.
Figure 36:
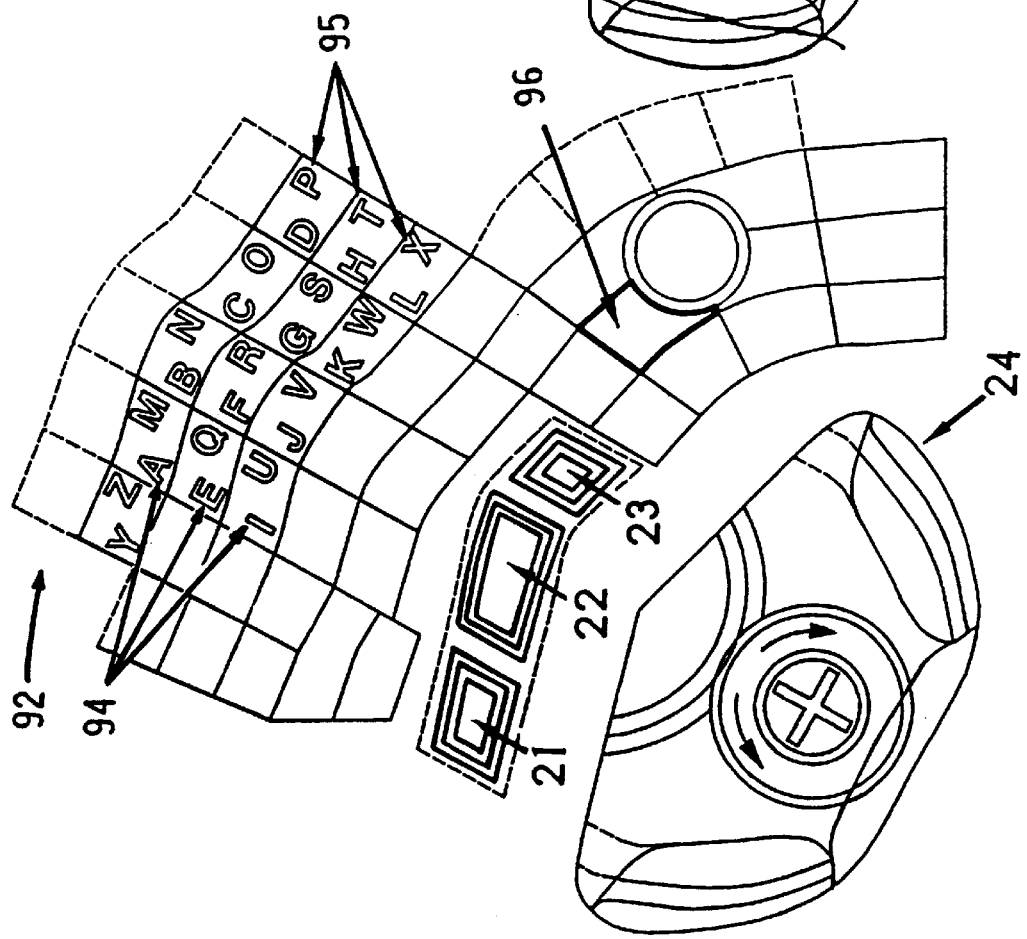

Referring next to FIGS. 36–37 showing two types of single-hand keyboards, the split alphabet single-hand keyboard 92 and the completed alphabet single-hand keyboard 93.

FIG. 36 is a single-hand keyboard 92 with 52 keys including palm keys 21, 22, and 23. In this type of keyboard 92, only half of alphabet (i.e. first half of alphabet, also called the first-hand panel 94 which depicts the characters in the lower left corner of the keys or second half of alphabet, also called the second hand panel 95 which depicts the characters in the upper right corner of the keys) on keyboard 92 can be actuated at a time. Switch hand key 96 (i.e. a flip-flop key) is used to switch the keyboard back and forth between first-hand panel 94 and second-hand panel 95 during data processing. Any key outside the three middle-fingers' domains or described in FIGS. 38, 39 can be assigned as a switch-hand key; but it is preferably a key from either the thumb domain or palm-key domain. This avoids the interference of key-in letters with the three middle fingers.

FIG. 37 is a single-hand keyboard 93 with 67 keys capable of assigning the entire English alphabet on a single-hand keyboard without requiring a switch-hand key. On keyboard 93, the surface area of each key has been reduced by up to ⅓ in height, not width, thus allowing more rows of keys to be added to the keyboard without sacrificing the ergonomics and typing efficiency. It is preferable that the width of each key be equal to or a little greater than the width of each finger that controls its corresponding finger domain.

Figure 39:
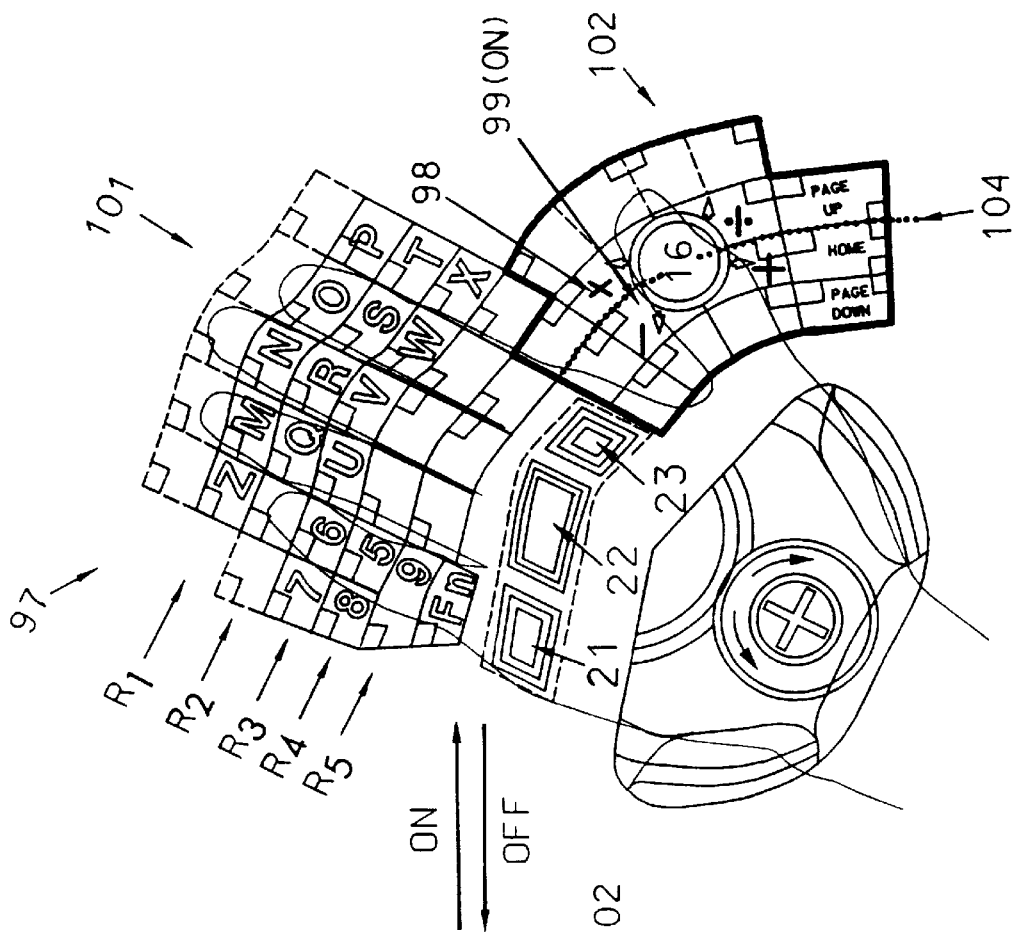
FIGS. 38, 39 are top plan views of a left-quadrant keyboard with a shift-hand key programmed to be a single-hand keyboard; the shift-hand key switches the keyboard between its first-hand and second-hand panel.
Figure 38:
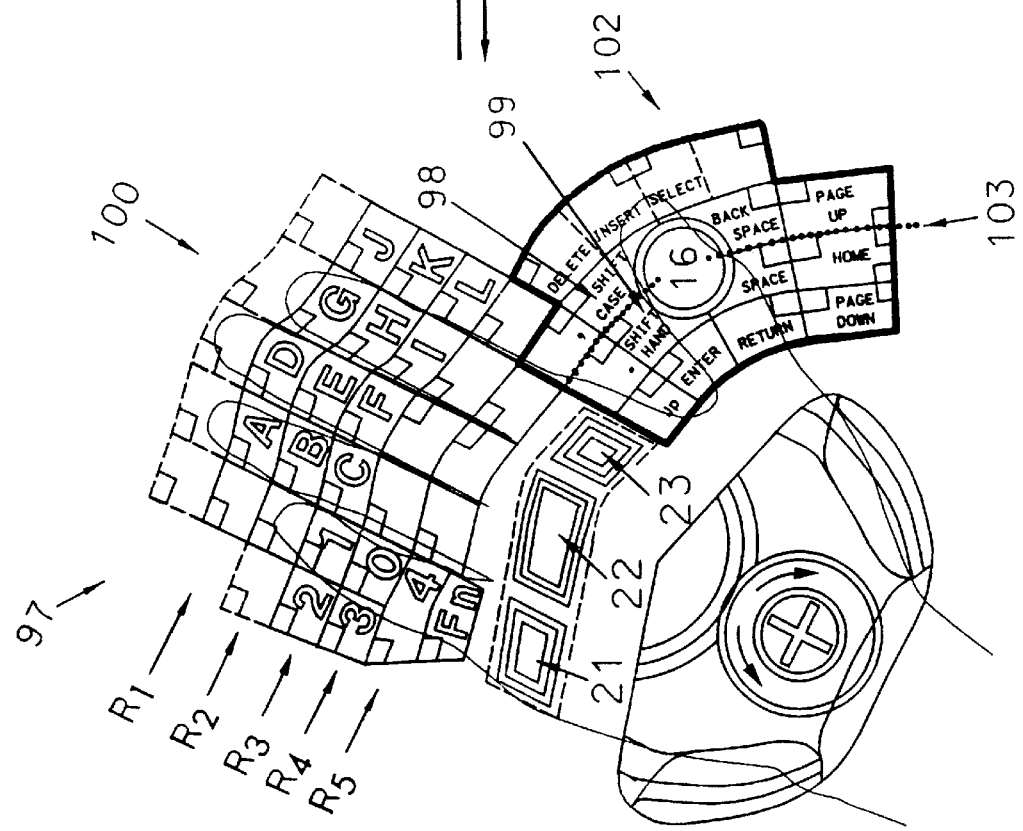

Referring next to FIGS. 38–39 demonstrating the function of shift-hand key 99 in a single-hand half-panel keyboard 97. Single-hand typing can be performed by either left-hand quadrant keyboard 97 or right-hand quadrant keyboard (not shown) depending on a user's preference.

Character arrangement on a left quadrant is referred to as a left-hand panel 100 in a single-hand keyboard. A left-hand panel is also referred to as the first-half panel in a single-hand keyboard. Character arrangement on a right quadrant is referred to as a right-hand panel 101. A right-hand panel 101 is also referred to as a second-half panel in the single-hand keyboard.

Each quadrant keyboard is designated to be capable of performing the functions of entire paired keyboards.

The kind of characters (e.g. English alphabet, Mandarin phonetics, etc.) and the style of character arrangement (e.g. in horizontal order or vertical order, in half-panel or full-panel) can be varied depending on a user's selection.

To operate a single-hand keyboard 97 with a shift-hand key 99, characters in the single-hand keyboard 97 stay in the first-half panel 100 unless the shift-hand key 99 is actuated. When shift-hand key 99 is actuated (i.e. press down and hold), characters in the single-hand keyboard 97 switch from first-half panel 100 to the second-half panel 101, except those characters in the thumb domain 102 which are controlled by the palm key domain 21, 22, 23. By releasing the shift-hand key 99, the characters in the second-half panel 101 automatically go back to the first-hand panel 100.

To switch characters between first panel 103/second panel 104 and lower-case/upper-case (not shown) in the thumb domain 102, pressing two additional keys outside the thumb domain 102 is required. It is preferred that these two keys will not interfere or limit any of the five fingers' performance; therefore, palm keys 21,22, 23 are the preferred keys to control the switching modes in the thumb domain 102. The pinkie-finger palm key 21 is the control key for the cursor controller 16. The middle-finger palm key 22 is a shift-case key for the thumb domain 102. The index-finger palm key 23 is a switch-hand panel key for the thumb domain 102. The co-operative mode of middle-finger palm key 22 and index-finger palm key 23 switch the keyboard to the upper-case characters of the second-thumb panel (refer to FIG. 12 arrangement "c", the palm key mode M4).

During typing, it is very common to key-in certain upper-case characters. In QWERTY-style keyboards currently used, there is only one shift key and it takes two hands to do the job; one hand holds down the shift key while another hand types in the desired upper case character. In the single-hand half-panel keyboard 97, there are more shift keys but, also, only one hand is required to key in the upper-case characters. The shift keys are located in different domains than the characters being typed; therefore, there is no key-in interference between a shift key and characters it controls during typing. For example:

1) Characters on the keyboard always stay on the lower-case of first-half panel 100, unless either shift key(s) are actuated.
2) Actuating the shift-case key 98, switches the lower-case characters to the upper-case characters in the first-half panel 100 in the four-finger domains except the thumb domain.
3) Actuating the shift-hand key 99 switches characters from the first-half panel lower-case 100 to the second-half panel lower-case 101 in the four-finger domains except the thumb domain.
4) Actuating the shift-hand key 99 and shift-case key 98 simultaneously switches the characters from the first-half panel lower-case 100 to the second-half panel upper-case (not shown) in the four-finger domains except the thumb domain.
5) Actuating the middle-finger palm key $P_{m-r}$22 switches the characters in the thumb domain 102 from lower-case characters 103 to the upper-case characters.

6) Actuating the index-finger palm key $P_i$ 23, switches the characters in the thumb domain 102 from the first-thumb panel lower case 103 to the second-thumb panel lower case 104.

7) Actuating the index-finger palm key $P_i$ 23 and middle-finger palm key $P_{m-r}$ 22 simultaneously, switches the characters in the thumb domain 102 from first-thumb panel lower-case 103 to the second-thumb panel upper-case (not shown).

Figure 40:
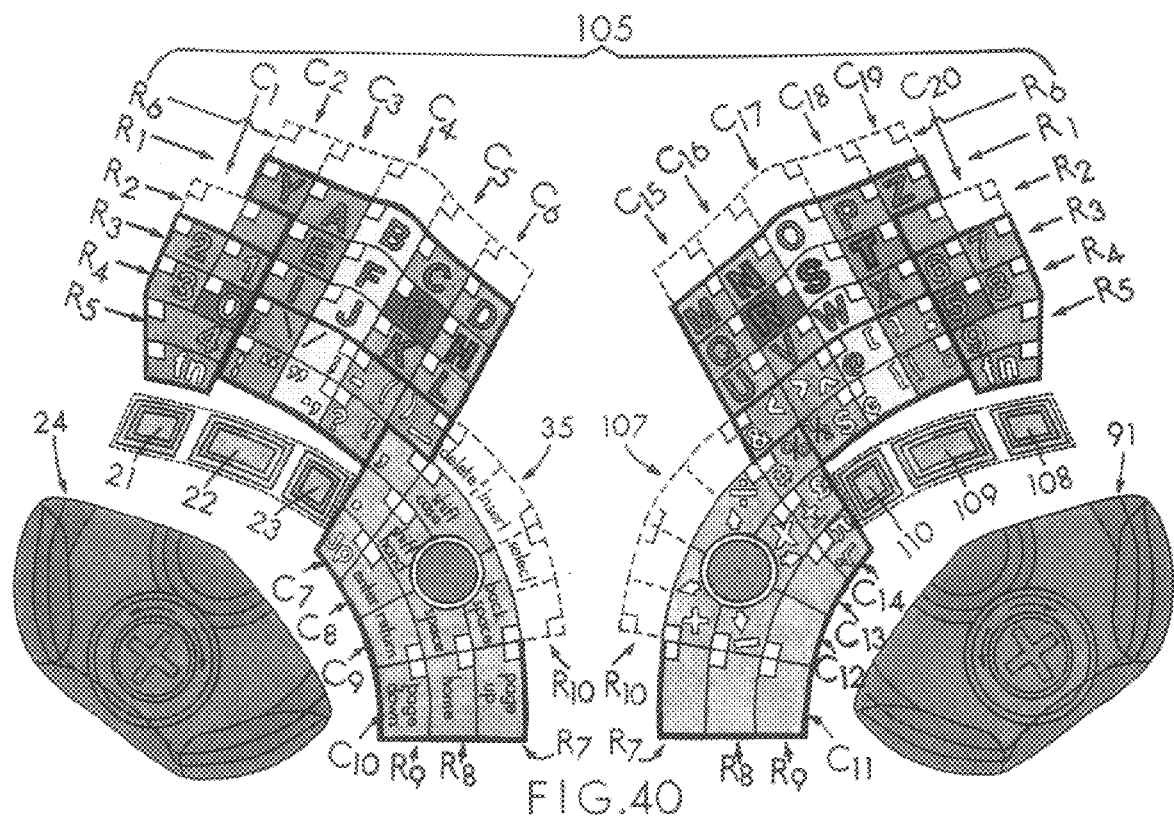
FIG. 40 is a top plan view of a pair of keyboards illustrating the rules of color coding on the keyboards.

Referring next to FIG. 40, this is a pair of keyboards 105 illustrating the rules of color coding on the keys and characters. A color-coded keyboard provides a better visual aid and reinforces the idea of a user-friendly keyboard.

Each key in the keyboard has multiple attributes which related to its location, function and means of operation. Some important attributes are listed below:

1. Location: indicates where the key is situated in the keyboard, i.e. column and row relationship of a key. There are twenty columns $C_1$–$C_{20}$ and ten rows $R_1$–$R_{10}$ on the preferred embodiment of this invention.
2. Function: indicates which functional group the key belongs to, i.e. alphabetic, numeric, punctuation, symbolic, etc. There can be unlimited functional groups besides the above four basic functional groups (refer to FIG. 27 and its description).
3. Operation: indicates how to operate the key and which part of the hand controls the key, i.e. the domain a key is situated in. There are seven domains in this preferred embodiment including the joypad which is controlled by the lower palm portion of a hand.
4. Co-operative relationship: indicates which two or more keys work together, i.e. in each quadrant keyboard, there is a cursor controller, four shift keys, and many other specially programmed co-operative keys.
5. Frequency: indicates the frequency of usage of a character, such as space, comma (,), period (.), the five high-frequency consonants (i.e. T, N, R, S, H).

In order to highlight each key's attributes as orderly and clearly as possible so that a user can comprehend the keyboard layout at a glance, combinations of outlines, colors and inlays are used to manage these vast amounts of attributes.

Outlines: outlines are used to delineate the boundaries of the blocks, the keys and the characters.

1. Blocks: boundaries of different functional blocks, especially on each high-frequency block, can be outlined in black between the key gaps of two adjacent blocks (refer to FIG. 27 and its description).
2. Keys: if desired, keys can be outlined in color to aid in understanding the specific attributes related to that key.
3. Characters: characters are outlined in black with varying thickness of outlines. Black outlines can be visualized easier than other colors and also benefit those users who may be color blind. The difference in thickness of the outline is an indication of the frequency of usage for that character. Frequently used characters may have thicker outlines.

Colors: rainbow colors and their orders are the main theme for the background colors of the hand domains, with the exception of the home keys. The background colors for keys are light color; the background color of each home key is consistent with its domain color but darker than the rest of keys in the same domain. Keys and characters may have colors different from their domain colors.

1) Domains: each domain in a quadrant keyboard is assigned to one rainbow color in the following sequence:

red: pinkie-finger domain $C_1$–$C_2$, $C_{19}$–$C_{20}$;
orange: ring-finger domain $C_3$, $C_{18}$;
yellow: middle-finger domain $C_4$, $C_{17}$;
green: index-finger domain $C_5$–$C_6$, $C_{15}$–$C_{16}$;
blue: thumb domain $C_7$–$C_{10}$, $C_{11}$–$C_{14}$;
indigo: joypad domain 24, 91; and
violet: outline color of keys 21–23, 108–110 in the palm-key domain.

2. Keys: the background color of a key depends on the domain it is situated in. The background color of home keys are slightly darker than the rest of the keys in the same domain. This provides a visual aid in placing the fingertips on the home keys. The co-operative keys may have the same color coded on the keys to indicate their co-operative relationship.
3. Characters: the outline color for the characters are black unless otherwise described. Characters may also have inlay colors.
4. Inlays: preferably inlay colors differ from the background color of the keys and also bring out their color contrast. Red inlay is assigned to the vowels; blue inlay is assigned to the consonants; green inlay is assigned to the numbers. Other colors not described here (e.g. white, gray, brown, etc.) will be used for other purposes. Examples of color coded keys and characters based on the above described rules are given as follows:

EXAMPLE 1

The key in the $R_2C_{18}$ position is:
a) situated in a ring-finger domain—orange background;
b) a home key—slightly darker orange background;
c) assigned to the character "T"—blue inlay of consonant;
d) "T" is a high-frequency consonant—thicker black outline.

Therefore, the key and character in $R_2C_{18}$ is: dark orange background with a thick outline "T" and blue inlay.

EXAMPLE 2

The key in the $R_3C_{15}$ position is:
a) situated in the index-finger domain—the green color;
b) not a home key—background is light green;
c) assigned to the character "U", a vowel—red inlay;
d) situated in the corner of high-frequency block—the key has black outline at the key gaps between the two blocks.

Therefore the key and character in position $R_3C_{15}$ is: light green in key background, black outline of character "U" with red inlay and black block outlines at the left side, lower side of the key gaps.

EXAMPLE 3

The palm key 21 is:
a) located in the palm-key domain—purple color domain;
b) a control key for the cursor controller—the cursor controller is the home of the thumb tip, a darker blue coded area. Therefore, the palm key 21 has light purple outline with dark blue inlay and black outline between the two colors.

EXAMPLE 4

The palm key 22 is a control key (i.e. shift case) in the thumb domain; therefore, the key has a light purple outline and a light blue inlay with black outline in between to separate the two colors. Similarly, palm key 23 is another control key (i.e. shift-hand panel to the thumb domain); therefore, the key also has a light purple outline and light blue inlay with black outline in between.

The same inlay color, i.e. light blue, of the two or more keys is also an indication of their co-operative relationship. In this case, it requires both palm keys 22, 23 to be actuated to shift the mode from the first-thumb panel lower case to the second-thumb panel upper case if single-hand typing is applied.

Example 3 and 4 indicate that co-operative keys are preferred to have the same inlay color to elucidate their co-operative relationship.

Referring to FIG. 41 illustrating some user friendly typing training guide for a keyboard:

1. All keys on the keyboard 111 are displayed on the frame 112 of a monitor 127.
2. Different sections of keyboard layout can be posted along the monitor frame 112. Instead of looking down at the keyboard 111, a user can refer to the border 112 of the monitor for help in locating the desired keys. A preferred arrangement of different keyboard sections on the monitor frame 112 is given as follows:
   a) The left- and right-hand high-frequency blocks 113, 114 are located at the top of the monitor on the left and right side respectively.
   b) Punctuation section 115 is on the top left side next to the left-hand high-frequency block 113.
   c) Symbolic section 116 is on the top right side next to the right-hand high-frequency block 114.
   d) Left- and right-hand pinkie-finger domains 117, 118 are located on the top left and right corners respectively.
   e) Number function codes i.e. Fn1, Fn2, etc. are listed on the left side 119 of the frame.
   f) Letter function codes, i.e. Fnsearch, Fndelete, etc., are listed on the right side 120 of the frame.
   g) Left- and right-hand thumb domains 121, 122 are located on the bottom of the frame.
   h) Left- and right-hand palm key modes 123, 124 are on the outside next to the left- and right- thumb domain 121, 122 respectively.
3. A keyboard layout image 125, i.e. a guiding image, is showing on the monitor in a close proximity to the information under processing. The keyboard layout image 125 is positioned directly below a program pointer where data is to be processed. This keeps the keyboard image in a "same visual field" as the letters or symbols that are being typed. A visual field, in the present invention, is defined as a clear visual scope that does not require a viewer to move his eyeballs for viewing objects within the scope. This scope varies by distance and is different among different viewers. The described "same visual field" in this invention, is intended to place a guiding image as close to the object(s) to be guided as possible so that a keyboard user does not have to frequently move his eyeballs for viewing the two objects in different visual fields. As an example, a scope of visual field, in the present invention, is a distance preferably less than 10 cm between two objects when viewing in a distance approximately 50 cm from the eye of a keyboard user to a monitor. The keyboard layout image serves as guide and the program's cursorial indicator is a place or an object to be guided. As the program pointer moves across the monitor, the keyboard image 125 and its cursorial indicator 126 moves along with it. This action enhances the user-friendly keyboard. This also provides more versatile keyboard layout images since character assignment in the image can be changed easily according to the needs of the information or document to be processed.
4. The keyboard 111, its sections 113 to 124 posted on the frame 112 of the monitor, and its image on the screen 127 can be color-coded to guide the user for a correct and efficient means in operating the keyboard at a quick glance. Rules regarding the color coding are as described previously.

Although the present invention has been described with reference to preferred embodiments, numerous modifications and variations can be made and still the result will come within the scope of the invention. No limitation with respect to the specific embodiments disclosed herein is intended or should be inferred.

We claim:

1. An ergonomic keyboard comprising:
   a left quadrant having an angle ranging from 25° to 35° from a user's body centerline;
   a right quadrant having an angle ranging from 25° to 35° from a user's body centerline; and
   said left and right quadrants each having a curved home row of keys located to conform to a user's index, middle, ring, and pinkie fingers when bent in a slightly flexed position; and each quadrant having a curved adjacent upper row of keys above the home row and a curved adjacent middle row of keys below the home row and a curved adjacent lower row of keys below the middle row and a curved adjacent bottom row of keys below the lower row, said keys forming four columns, each comprising a domain and each having an alignment with a centerline of a user's index, middle, ring, and pinkie fingers; and each quadrant having a fifth column of four keys inboard from a user's index finger and a column of at least two keys outboard from a user's pinkie finger defining a pinkie-domain area; and each quadrant having a plurality of keys located in a thumb-domain area defined by a reach of a user's thumb; and each quadrant having a palm support to enable a user to touch every key without lifting his palm from the palm support.

2. The keyboard of claim 1, wherein the thumb-domain area further comprises a cursor controller for controlling a cursorial indicator.

3. The keyboard of claim 1, wherein said pinkie-domain area of each quadrant further comprises numeric designations and diacritic symbols.

4. The keyboard of claim 1, wherein the character assignment of the home, upper, middle, and bottom row of keys on the left quadrant are designated A through L and Y, and the home, upper, middle, and bottom row of keys on the right quadrant are designated M through X and Z.

5. The keyboard of claim 1, wherein the palm support further comprises a joypad controller.

6. The keyboard of claim 1, wherein each quadrant further comprises a power-reach row of keys located above the upper row.

7. The keyboard of claim 1, wherein each quadrant further comprises a palm key row comprising three keys below the bottom row of keys, wherein the palm keys can be actuated individually or synchronously by combination of any two or all three palm keys.

8. The keyboard of claim 6, wherein each quadrant further comprises a key designation flip/flop key to change each key to a key on the opposite quadrant keyboard, and an uppercase key adjustment to the flip/flop key thereby enabling one-handed typing on either keyboard.

9. The keyboard of claim 6, wherein the palm support further comprises a forward and backward moving mechanism to enable a user to reach the power-reach row of keys without moving his palm off the palm support.

10. The keyboard of claim 2, wherein the thumb-domain area further comprises circular array keys concentric with the cursor controller to enable a user to touch these keys without lifting this thumb, said circular array of keys further comprises an inward home row and an outward home row.

11. The keyboard of claim 3, wherein the pinkie-domain area further comprises a function key to enable a user to hold the function key down with his pinkie finger while touching a number key with his ring finger.

12. The keyboard of claim 1, wherein the thumb-domain area further comprises a thumb curved key cluster.

13. The keyboard of claim 1, wherein the palm support is fixedly adjustable forward and backward to enable ease of use by a plurality of users having different hand sizes.

14. The keyboard of claim 5, wherein the joypad controller further comprises a circular motion sensor and an X-axis and a Y-axis controller.

15. The keyboard of claim 10, wherein the character assignment of the said circular array keys are:
   shift-hand key adjacent to said cursor controller on the inward home row of the thumb domain;
   space key adjacent to said cursor controller on the outward home row of the thumb domain;
   shift-case key placed adjacent to the shift-hand key, whereby the shift-hand key and shift-case key can be actuated simultaneously by a user's thumb.

16. The keyboard of claim 10, wherein the character assignment of the said circular array keys from the shift-hand key immediately adjacent to the left of the cursor controller in clockwise order further comprises a comma (,) key, period (.) key, back-space key, space key, return key, enter key, and shift-case key.

17. The keyboard of claim 10, further comprising a row of keys comprising a top, home, and lower row adjacent to said outward home row of keys.

18. The keyboard of claim 17, wherein the character assignment of the said outward home row of keys further comprises:
   a page-up key on the top row;
   a home key on the home row;
   a page-down key on the lower row;
   which keys are single-finger synchronous keys whereby the page-up key and home key may be actuated simultaneously with the thumb so the user can move the cursorial indicator to the beginning of a program or document; and whereby a user may actuate the page-down key and home key with the thumb simultaneously to move the cursorial indicator to the end of a program or document.

19. The keyboard of claim 1, wherein the keys of the home row and the upper and lower rows further comprise a high-frequency block assigned to the most frequently used characters of a specific program or language.

20. The keyboard of claim 19, wherein:
   said high-frequency block further comprises alphabet characters;
   said small-finger domains further comprise numeric characters;
   said left-quadrant lower row and bottom row further comprises punctuation characters;
   said right-quadrant lower row and bottom row further comprises symbolic characters;
   said power-reach rows further comprise basic computer function keys;
   said thumb domains further comprise basic word process function keys; and
   said palm key domain further comprise toggle-switch function keys.

21. The keyboard of claim 12, wherein the thumb-curved key cluster further comprises:
   a cursor controller at a user's thumb tip;
   an upper row of thumb keys arranged above a curved line alone an arc described by a user's thumb through the center of said cursor controller;
   a middle row of thumb keys arranged below said upper row; and
   a lower row of thumb keys arranged below said middle row.

22. The keyboard of claim 21, wherein said thumb-curved key cluster further comprises:
   a shift-case key at a 10 o'clock position relative to a centerline from said palm domain through said cursor controller;
   a backspace key immediately clockwise from said shift-case key;
   a space key immediately clockwise from said backspace key; and
   a shift-hand key immediately clockwise from said space key, wherein all of said keys are in a circular arrangement about said cursor controller.

23. The keyboard of claim 21, wherein the key assignments of the thumb domain further comprise:
   the upper row of keys progressing from the inward to the outward are:, (comma), shift-case key, backspace key, page-up key;
   the middle row of keys progressing from the inward to the outward are:, (period), shift-hand key, space key, home key; and
   the lower row of keys progressing from the inward to the outward are: jump key, enter key, return key, page-down key.

24. The keyboard of claim 1, wherein:
   the pinkie-finger domain comprises the color red;
   the ring-finger domain comprises the color orange;
   the middle-finger domain comprises the color yellow;
   the index-finger domain comprises the color green;
   the thumb domain comprises the color blue;
   the joy pad controller comprises the color indigo; and
   the palm-key domain outline color comprises the color violet.

25. The keyboard of claim 4, wherein the characters further have an outline comprising a variable line thickness.

26. The keyboard of claim 24 further comprising:
   an inlay color for vowel characters which is red;
   an inlay color for consonants which is blue; and
   an inlay color for numeric characters which is green.

27. The keyboard of claim 18 wherein the synchronous keys comprise the same color.

28. The keyboard of claim 1, further comprising a detachable connection between the left quadrant and right quadrant whereby said quadrants may be separated by a user.

29. The keyboard of claim 1 wherein the height of each key is in the range of 0.7 to 1.2cm.

30. The keyboard of claim 1 wherein the cursor controller further comprises a mouseball.

31. A method of illustrating use of the user-friendly keyboard to a typist on a monitor comprising the steps of:
rendering a graphic depiction of a keyboard;
dividing the rendering into sections comprising;
  left- and right-hand high-frequency blocks;
  a punctuation block;
  a symbolic block;
  left- and right-hand pinkie-finger blocks;
  a number function block;
  left- and right-hand thumb blocks;
  left- and right-hand palm-key blocks;
placing each section onto a monitor frame for viewing by a user in an arrangement comprising;
said left- and right-hand high-frequency blocks located at the top of a monitor frame on the left and right side respectively;
said punctuation block located at the top of a monitor frame adjacent to said left-hand high-frequency block;
said symbolic section located at the top of a monitor frame adjacent to said right-hand high-frequency block;
said left- and right-hand pinkie-finger blocks located at the ton of a monitor frame at the left and right corners respectively;
said number-function block located on the left side of a monitor frame;
said left- and right-hand thumb blocks located on the bottom of a monitor frame at the left and right side respectively;
said left- and right-hand palm-key blocks located on the bottom of the frame of a monitor adjacent to said thumb blocks; and
whereby a user may refer to said blocks for keyboard layout for entry of data on a computer while a user is viewing a monitor.

\* \* \* \* \*